(12) United States Patent
Makino et al.

(10) Patent No.: US 11,559,804 B2
(45) Date of Patent: Jan. 24, 2023

(54) ANALYSIS DEVICES, ANALYSIS KITS, AND ANALYSIS SYSTEMS

(71) Applicant: TOPPAN PRINTING CO., LTD., Taito-ku (JP)

(72) Inventors: Yoichi Makino, Taito-ku (JP); Akihiro Hoshino, Taito-ku (JP); Tomoko Kunitomi, Taito-ku (JP); Keisuke Goto, Taito-ku (JP); Yosuke Horiuchi, Taito-ku (JP)

(73) Assignee: TOPPAN PRINTING CO., LTD., Taito-ku (JP)

(*) Notice: Subject to any disclaimer, the term of this patent is extended or adjusted under 35 U.S.C. 154(b) by 585 days.

(21) Appl. No.: 16/173,102

(22) Filed: Oct. 29, 2018

(65) Prior Publication Data
US 2019/0060897 A1   Feb. 28, 2019

Related U.S. Application Data

(63) Continuation of application No. PCT/JP2017/016997, filed on Apr. 28, 2017.

(30) Foreign Application Priority Data

Apr. 28, 2016  (JP) .............................. JP2016-091949

(51) Int. Cl.
 *G01N 21/64* (2006.01)
 *B01L 3/00* (2006.01)
 *B01L 7/00* (2006.01)

(52) U.S. Cl.
 CPC ........ *B01L 3/502715* (2013.01); *G01N 21/64* (2013.01); *G01N 21/6458* (2013.01);
(Continued)

(58) Field of Classification Search
CPC ...................................................... G01N 21/64
(Continued)

(56) References Cited

U.S. PATENT DOCUMENTS

| 2003/0138941 A1 | 7/2003 | Gong et al. | |
| 2008/0176290 A1* | 7/2008 | Joseph | B01L 7/5255 435/91.2 |

(Continued)

FOREIGN PATENT DOCUMENTS

| JP | 2005-506541 A | 3/2005 |
| JP | 2010-8223 A | 1/2010 |

(Continued)

OTHER PUBLICATIONS

International Search Report dated Aug. 8, 2017 in PCT/JP2017/016997, filed Apr. 28, 2017, citing documents AO-AQ therein, 5 pages.

(Continued)

*Primary Examiner* — Christine T Mui
(74) *Attorney, Agent, or Firm* — Oblon, McClelland, Maier & Neustadt, L.L.P.

(57) ABSTRACT

An analysis apparatus including a stage, an analysis device placed on the stage and including receiving sections which accommodate a sample and a reagent for biochemical reaction, and are communicated with one another through a flow path having an inlet and an outlet, a liquid introduction section which is connected to the inlet and supplies into the flow path the sample, the reagent, and an sealing liquid for sealing each of the receiving sections, and a waste liquid storage section which is connected to the outlet and stores as waste liquid an excess of the sample and the reagent and a part of the sealing liquid supplied to the flow path, an optical system which includes an objective lens, emits excitation light to the receiving sections and allows observation of (Continued)

fluorescence generated in the receiving sections by the excitation light, and a control unit that controls such that the sealing liquid and the excess of the sample and the reagent form an interface in the waste liquid storage section, and that the interface is formed at a distance not less than a fluorescence-obtainable distance from a bottom of the receiving sections.

20 Claims, 6 Drawing Sheets

(52) U.S. Cl.
CPC ......... *B01L 7/52* (2013.01); *B01L 2200/0642* (2013.01); *B01L 2200/142* (2013.01); *B01L 2300/0636* (2013.01); *B01L 2300/0654* (2013.01); *B01L 2300/0809* (2013.01); *B01L 2300/0816* (2013.01); *B01L 2300/12* (2013.01); *G01N 2201/062* (2013.01)

(58) Field of Classification Search
USPC ........................................................ 436/172
See application file for complete search history.

(56) References Cited

U.S. PATENT DOCUMENTS

| | | | |
|---|---|---|---|
| 2010/0041046 | A1* | 2/2010 | Chiu ................. B01L 3/502784 435/287.2 |
| 2012/0196774 | A1 | 8/2012 | Fournier et al. |
| 2016/0333400 | A1 | 11/2016 | Makino et al. |

FOREIGN PATENT DOCUMENTS

| | | |
|---|---|---|
| JP | 2014-70991 A | 4/2014 |
| WO | WO 2015/115635 A | 8/2015 |

OTHER PUBLICATIONS

Kim et al., "Large-scale femtoliter droplet array for digital counting of single biomolecules", Lab on a Chip vol. 12, The Royal Society of Chemistry 2012, DOI: 10.1039/c2lc40632b, pp. 4986-4991, 2012.

* cited by examiner

ANALYSIS DEVICES, ANALYSIS KITS, AND ANALYSIS SYSTEMS

CROSS-REFERENCE TO RELATED APPLICATIONS

The present application is a continuation of International Application No. PCT/JP2017/016997, filed Apr. 28, 2017, which is based upon and claims the benefits of priority to Japanese Application No. 2016-091949, filed Apr. 28, 2016. The entire contents of these applications are incorporated herein by reference.

BACKGROUND OF THE INVENTION

Field of the Invention

The present invention relates to analysis devices, analysis kits, and analysis systems.

Discussion of the Background

In recent years, measurements of biomaterials and cells by using fluorophores are performed for research and diagnosis purposes. For example, the fluorescence in situ hybridization (FISH) method is a technique by which fluorescently labeled oligonucleotide probes are hybridized to target genes so that fluorescence emitted from the fluorescently labeled oligonucleotide probes specifically bound to the target genes can be detected by fluorescence microscope.

Patent Literature 1 discloses that enzyme reaction is performed in a microspace having a volume of 1 picoliter (pl) or less.

Further, PTL 2 describes a method for detecting a difference in a single base in genes by performing the Invader reaction in microchambers.

PTL 1: US2012/0196774 A
PTL 2: WO2015/115635
NPL 1: Lab on a Chip, Vol. 12, pp. 4986-4991, 2012

SUMMARY OF THE INVENTION

According to an aspect of the present invention, an analysis apparatus includes a stage, an analysis device placed on the stage and including receiving sections which accommodate a sample and a reagent for biochemical reaction, and are communicated with one another through a flow path having an inlet and an outlet, a liquid introduction section which is connected to the inlet and supplies into the flow path the sample, the reagent, and an sealing liquid for sealing each of the receiving sections, and a waste liquid storage section which is connected to the outlet and stores as waste liquid an excess of the sample and the reagent and a part of the sealing liquid supplied to the flow path, an optical system which includes an objective lens, emits excitation light to the receiving sections, and allows observation of fluorescence generated in the receiving sections by the excitation light, and a control unit which controls such that the sealing liquid and the excess of the sample and the reagent form an interface in the waste liquid storage section, and that the interface is formed at a distance not less than a fluorescence-obtainable distance from a bottom of the receiving sections.

According to another aspect of the present invention, an analysis device includes receiving sections which accommodate a sample and a reagent used for biochemical reaction and are communicated with one another through a flow path having an inlet and an outlet, a liquid introduction section connected to the inlet, and a waste liquid storage section connected to the outlet. The waste liquid storage section and the receiving sections are positioned such that a shortest distance between the waste liquid storage section and the receiving sections along the flow path is 2 mm or more.

According to still another aspect of the present invention, an analytical method includes supplying a sample and a reagent such that the sample and the reagent enter into a container, supplying a sealing liquid such that the sealing liquid seals the container, controlling the supplying of the sample and the reagent and the supplying of the sealing liquid such that an excess of the sample and the reagent and a part of the sealing liquid are stored outside the container as waste liquid forming an interface between the sealing liquid and the excess of the sample and the reagent, and that the interface is formed at a distance not less than a fluorescence-obtainable distance from a bottom of the container, applying an excitation light to the container, observing fluorescence generated by the excitation light, and conducting an analysis based on the fluorescence generated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
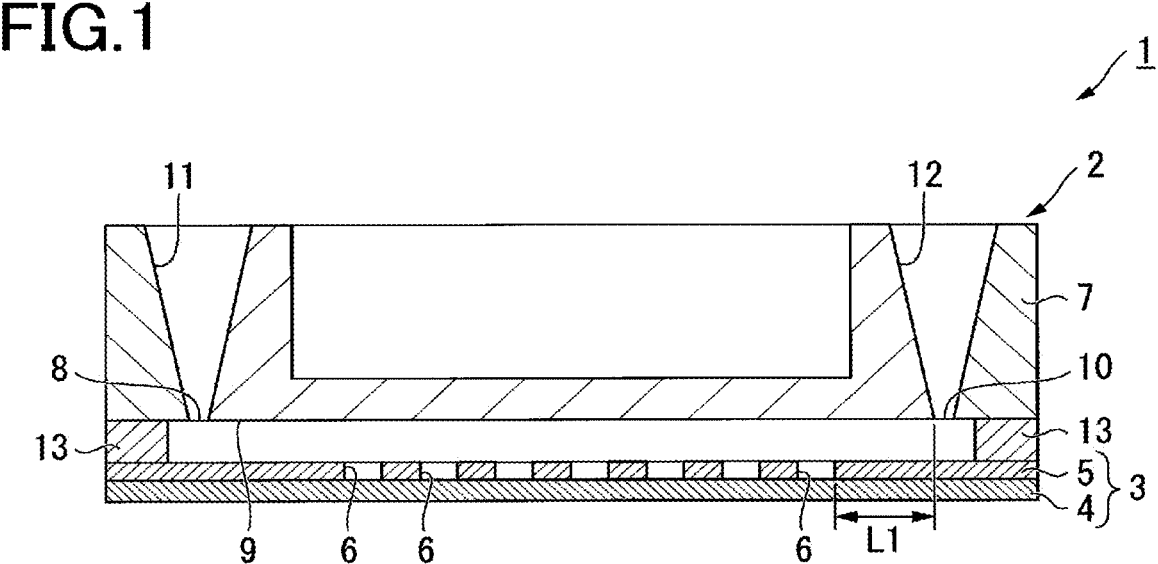
FIG. 1 is a schematic sectional view of an analysis device in an analysis kit according to a first embodiment of the present invention.

The embodiments will now be described with reference to the accompanying drawings, wherein like reference numerals designate corresponding or identical elements throughout the various drawings.

First Embodiment

Figure 2:
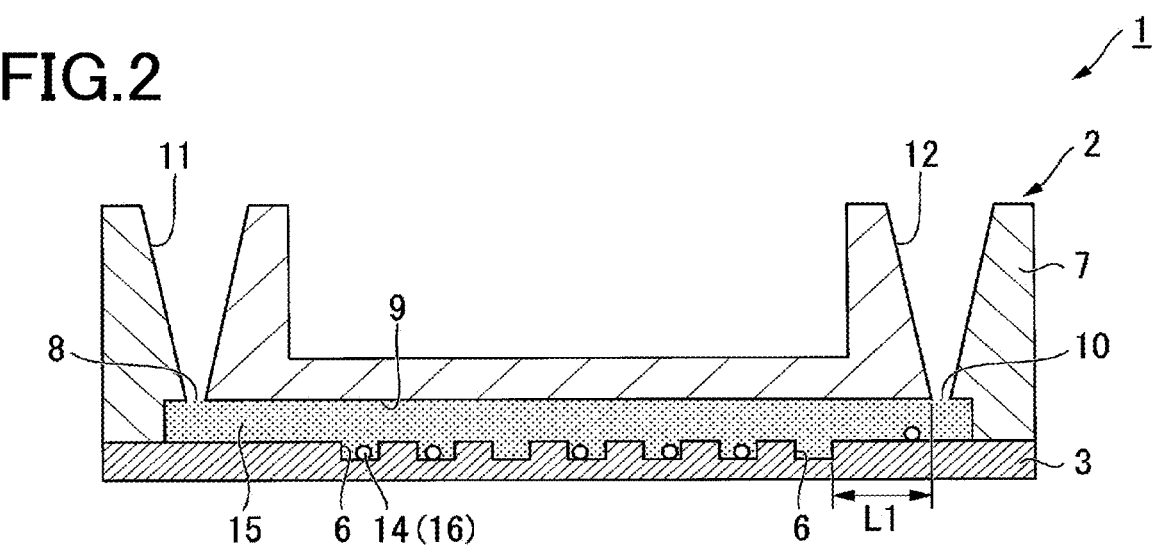
FIG. 2 is a schematic diagram illustrating that a mixed solution of a sample and a reagent has been introduced into the analysis device according to the first embodiment.
Figure 3:
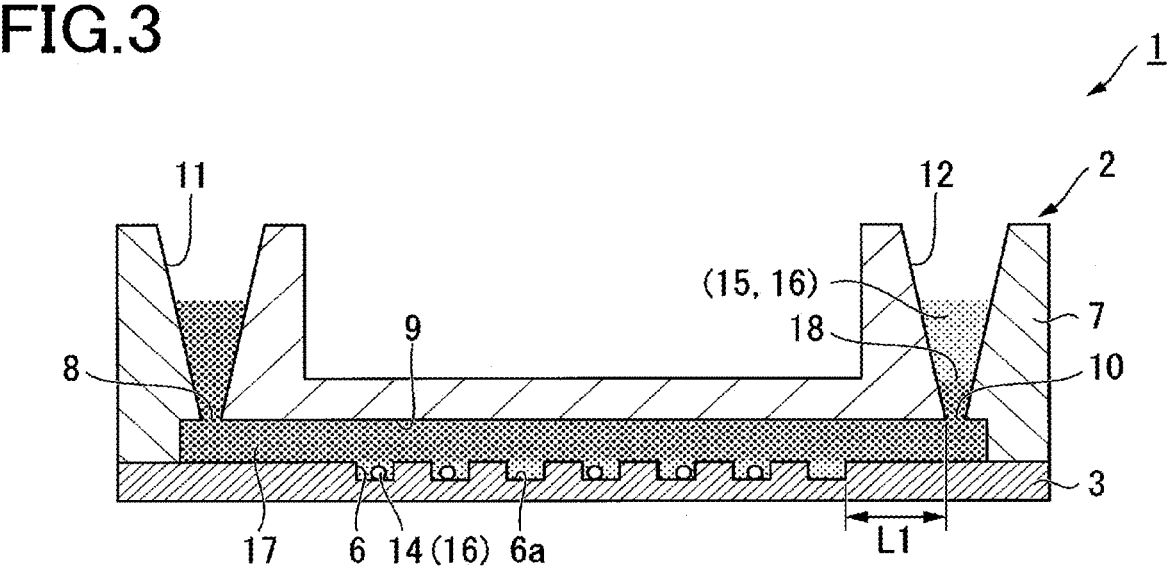
FIG. 3 is a schematic diagram illustrating that a sealing liquid has been introduced into the analysis device according to the first embodiment.

A first embodiment of the present invention will be described. FIG. 1 is a schematic sectional view of an analysis device in an analysis kit according to the present embodiment. FIG. 2 is a schematic diagram illustrating that a mixed solution of a sample and a reagent has been introduced into the analysis device. FIG. 3 is a schematic diagram illustrating that a sealing liquid has been introduced into the analysis device.

As shown in FIGS. 1 to 3, an analysis kit 1 according to the present embodiment includes an analysis device 2, beads 14, a reagent 15, and sealing liquid 17. The analysis kit 1 according to the present embodiment may not necessarily include the beads 14. For example, the analysis kit 1 according to the present embodiment may detect a measurement target substance via the beads 14, or if not containing the beads 14, it may directly analyze a measurement target substance introduced into the analysis kit 1 without using the beads 14.

The target to be analyzed by the analysis kit 1 according to the present embodiment is a sample such as nucleic acid. For example, the analysis kit 1 according to the present embodiment is available for quantitative determination of nucleic acid.

The analysis device 2 includes a base 3 and a cover 7.

The base 3 includes a substrate 4, and a micropore array layer 5 formed on the substrate 4.

The substrate 4 has, for example, a plate shape of substantially uniform thickness. The substrate 4 is made of a substantially transparent material. The material of the substrate 4 may be, for example, a resin, glass, or the like. Specifically, the substrate 4 may be made of polystyrene, polypropylene, or the like. Further, the substrate 4 has at least sufficient rigidity to resist breakage during handling by a transport device for the analysis device 2 or manual operation by an operator.

The micropore array layer 5 is a layer formed of an array of a plurality of through holes. The layer thickness of the micropore array layer 5 is, for example, 3 µm. Between the micropore array layer 5 and the cover 7 facing the micropore array layer 5 is a gap having a size of, for example, 100 µm.

Materials for the micropore array 5 may be resin, glass, and the like. As a material for the micropore array layer 5, a hydrophobic resin, which is compatible with sealing liquid (having high affinity with sealing liquid) may be used. Further, materials for the micropore array 5 may be the same as those of the substrate 4 or may be different from those of the substrate 4. Alternatively, the micropore array layer 5 may be integrated with the substrate 4, using the same material as that of the substrate 4. Alternatively, the micropore array layer 5 may be integrally formed with the substrate 4, using the same material as that of the substrate 4.

Examples of the material of the micropore array 5 made of resin include cycloolefin polymer, cycloolefin copolymer, silicone, polypropylene, polycarbonate, polystyrene, polyethylene, polyvinyl acetate, fluororesin, and amorphous fluororesin. These example materials of the micropore array 5 are merely illustrative, and do not limit the material of the micropore array 5.

The hydrophobicity in the present embodiment is defined that a contact angle between the hydrophobic material and a fluorine-based oil (product name: FC-40, a standard solution for a hydrophobic evaluation according to the present embodiment) in a contact angle test is in the range of 25 degrees or less. Preferably, the contact angle between the hydrophobic material and a fluorine-based oil is 10 degrees or less.

As an example of the contact angle between the material used for the micropore array layer 5 and a fluorine-based oil in the present embodiment, a contact angle between a cycloolefin polymer (COP), which is a hydrophobic resin, and a fluorine-based oil, is approximately 10 degrees.

The contact angle test was performed by a drop method.

The micropore array layer 5 can be formed on the substrate 4 by forming the micropore array layer 5 directly on the substrate 4, or by fixing a member on which the micropore array layer 5 is formed to the substrate 4 by means of adhesion, welding, or the like. For example, the micropore array layer 5 is formed by providing a member, which is a material for the micropore array layer 5, on the substrate 4, and then patterning the member so that part of the substrate 4 is exposed. More specifically, the micropore array layer 5 is formed by patterning a solid pattern of the hydrophobic film deposited on the substrate 4 by etching, embossing, cutting, or the like.

Thus, a plurality of receiving sections 6 are formed in the micropore array layer 5 such that the receiving sections 6 each have a bottom 6a, which is formed by an exposed portion of the substrate 4, exposed by removing the micropore array layer 5 by the patterning, and a side surface, which is formed by a portion of the micropore array layer 5 surrounding the exposed portion of the substrate 4.

When the receiving section 6 has an oval opening shape, for example, the long diameter is 7 µm and the short diameter is 3.5 µm. The depth of the receiving section 6 is, for example, 3 µm. Accordingly, the receiving section 6 has a hollow cylindrical shape with an oval cross sectional shape. Note that, the opening shape of the receiving section 6 is not specifically limited.

A distance (pitch) between the center lines of the plurality of receiving sections 6 is not limited as long as it is larger than the long diameter of the receiving section 6. The term "center line of the receiving section 6" as used herein refers to a line extending via the center of the opening of the receiving section 6 and parallel with the depth direction of the receiving section 6.

The spacing (gap) between the respective receiving sections 6 is set depending on the resolution by which signal detection can be independently performed in the respective receiving sections 6.

The respective receiving sections 6 are arranged in a triangular grid in the micropore array layer 5.

Note that, the arrangement of the receiving sections 6 is not specifically limited. The through holes formed in the micropore array layer 5 and the surface of the substrate 4 constitute the fine-sized receiving sections 6 of a bottomed cylindrical shape with the bottom 6a being formed by the substrate 4.

The volume of the receiving section 6 may be set as appropriate. When the volume of the receiving section 6 is small, a reaction time for a signal to be detectable is short. For example, the volume of the receiving section 6 may be 100 picoliter (pl) or less. Specifically, for the purpose of reducing a time required to saturate a signal so as to generate a sufficient signal, the volume of the receiving section 6 is set based on the amount of liquid at which each receiving section 6 contains at most one analysis target molecule.

The micropore array layer 5 may also be colored. With the colored micropore array layer 5, measurement of light such as fluorescence, luminescence, or light absorbance in the receiving sections 6 is performed while reducing the effect of light from the receiving section 6 which is adjacent to the receiving section 6 to be measured.

The receiving sections 6 formed by the micropore array layer 5 may include a hydrophobic portion in the upper part of the receiving sections 6, and a colored portion at a position closer to the bottom 6a of the receiving sections 6 than the hydrophobic portion is. With this configuration, autofluorescence or noise can be reduced during fluorescence measurement from the substrate 4 side, making the fluorescence signal easier to obtain. Further, when the colored portion is provided at a position close to the bottom 6a of the receiving sections 6, it has a light transmittance different from that of the transparent portion of the receiving sections 6. Accordingly, compared with the case where a portion of the receiving sections 6 close to the bottom 6a is transparent, focusing onto the receiving sections 6 of the micropore array layer 5 in microscopic observation is facilitated. The colored portion of the receiving sections 6 can be formed by, for example, metal vapor deposition or using a photoresist.

Further, when the micropore array layer 5 is integrally formed with the substrate 4, the portion corresponding to the receiving section 6 is formed by applying processing such as etching, embossing, or cutting to the micropore array layer 5.

Moreover, the micropore array layer 5 may have a hydrophobic portion and a hydrophilic portion. For example, the inner peripheral surface of the receiving sections 6 of the micropore array layer 5 may be formed as a hydrophilic portion, and the remaining portion of the micropore array layer 5 may be formed as a hydrophobic portion. In this case, when an aqueous sample 16 and the reagent 15 are used together with the oil-based sealing liquid 17, the sample 16 and the reagent 15 are less likely to adhere to the flow path 9.

Moreover, hydrophilic treatment may be applied to the micropore array layer 5 so that liquid can be smoothly introduced into the flow path 9 when various types of liquid are introduced between the micropore array layer 5 and the cover 7. For example, hydrophilic treatment such as oxygen plasma treatment, ozone water treatment, and the like can be selected as appropriate. Further, in order to facilitate formation of liquid droplets of the reagent 15 and the sample 16 in the receiving section 6 after supply of the oil-based sealing liquid 17, the micropore array layer 5 may be formed to exhibit a water repellent effect during supply of the sealing liquid 17. For example, a hydrophilic coating may be applied to the micropore array layer 5, which is formed in advance of a water repellent material or a material to which a water repellent agent is added. For example, a hydrophilic coating can be applied by lithography, printing and the like, which can be selected as appropriate. When a hydrophilic coating is applied to the water repellent micropore array layer 5, liquid can be readily held in the flow path 9 during initial supply of a mixed solution of the sample 16 and the reagent 15 to the flow path 9 since the surface of the micropore array layer 5 has hydrophilic properties. When the hydrophilic coating or a hydrophilic substance contained in the hydrophilic coating dissolves in the mixed solution of the sample 16 and the reagent 15, the micropore array layer having water repellent properties is exposed, which is suitable for supply of the oil-based sealing liquid 17.

Alternatively, the surface of the substrate 4 may be hydrophilic, and the surface of the micropore array layer 5 may be hydrophobic. In this case, the mixed solution of the sample 16 and the reagent 15 can be readily held on the surface of the substrate 4 which forms the bottom 6a of the receiving section 6.

Alternatively, the plurality of receiving sections 6 can be formed by patterning the substrate 4 after the outer surface of the hydrophilic substrate 4 is processed with a hydrophobic surface treatment to thereby form a hydrophobic portion and a hydrophilic portion so as to allow aqueous liquid to be readily held in the receiving sections 6.

The cover 7 is bonded to the base with a gap interposed between the micropore array layer 5 and the cover 7. The cover 7 is positioned spaced from the openings of the receiving sections 6 so as to cover the openings of the plurality of receiving sections 6.

In order to reduce autofluorescence, an additive such as a pigment may be added to the cover 7. Preferably, the cover 7 does not substantially include autofluorescence since the analysis device 2 according to the present embodiment is used to detect fluorescence or phosphorescence. In order to reduce autofluorescence, various dyes dissolved in the resin as well as the pigment dispersed in the resin can be used as colored components when the cover 7 is formed by injection molding or the like. The examples of the dye are listed below.

Specifically, a direct dye, basic dye, cationic dye, acidic dye, mordant dye, acidic mordant dye, sulfur dye, vat dye, naphthol dye, disperse dye, reaction dye, and the like can be used. In particular, disperse dye can be selected for dyeing of resin.

The cover 7 and the base 3 are connected to each other via a spacer 13. Accordingly, a space formed between the cover 7, the base 3 and the spacer 13 is provided as the flow path 9. The material for the spacer 13 is not specifically limited. For example, a double-sided adhesive tape formed of a core film made of a silicone rubber, acrylic foam, or the like and an acrylic adhesive agent provided on both surfaces of the core film, or a material having a certain thickness by applying an adhesive or the like can be selected as appropriate for the spacer 13. The material for the spacer 13 may be inorganic substances such as resin, metal, paper, and glass.

A material which is less reactive to the liquid to be supplied can be selected as appropriate for the spacer 13. Further, in order to facilitate introduction of liquid supplied into the flow path 9, the spacer 13 may be partially formed of a hydrophilic material or may undergo a hydrophilic treatment. For example, the cover 7 and the micropore array layer 5 may be hydrophobic, while the double-sided adhesive tape of the spacer 13 may be hydrophilic.

The cover 7 includes through holes which constitute an inlet 8 into the flow path 9 and an outlet 10 from the flow path 9. Further, the cover 7 includes a liquid introduction section 11 communicating with the inlet 8 and a waste liquid storage section 12 communicating with the outlet 10.

The liquid introduction section 11 has a shape of a container communicating with the inlet 8 of the flow path 9 so that the mixed solution of the sample 16 and the reagent 15, the sealing liquid 17, or the like can be supplied into the flow path 9 from the inlet 8 of the flow path 9. Further, the inner surface of the liquid introduction section 11 forms a tapered shape with the opening diameter gradually increasing from the inlet 8 of the flow path 9. Alternatively, the inner surface of the liquid introduction section 11 may be formed to conform to the shape of the tip of a pipette tip or a nozzle for dispensing liquid such as the mixed solution of the sample 16 and the reagent 15 or the sealing liquid 17 to facilitate the pipette tip or nozzle coming closely in contact with the inner surface of the liquid introduction section 11. Further, the liquid introduction section 11 may be formed to be connected to a syringe for supplying liquid such as the mixed solution of the sample 16 and the reagent 15 or the sealing liquid 17.

The waste liquid storage section 12 is connected to the outlet 10 of the flow path 9. The volume of the waste liquid storage section 12 is larger than the volume of the flow path 9. Accordingly, even if the sealing liquid 17 is introduced into the analysis device 2 to allow all the sample 16 and the reagent 15 to flow out from the flow path 9, the sample 16 and the reagent 15 do not overflow from the waste liquid storage section 12. The waste liquid storage section 12 and the receiving section 6 are spaced from each other along the flow path 9, and a shortest distance L1 therebetween is 2 mm or more. In the present embodiment, the shortest distance (straight distance) between the receiving section 6 located at a position closest to the outlet 10 of the flow path 9 (the boundary between the flow path 9 and the waste liquid storage section 12) among the plurality of receiving sections 6 and the outlet 10 of the flow path 9 is 2 mm or more. When the flow path 9 curves, the shortest distance between the waste liquid storage section 12 and the receiving section 6 may be measured along the curvature of the flow path 9.

The volume of the waste liquid storage section 12 is designed to be capable of accommodating an excess of the mixed solution of the sample 16 and the reagent 15 which overflows from the receiving section 6, and part of the sealing liquid 17. For example, the volume of the waste liquid storage section 12 is in the range from 100 to 1000 μL, preferably 150 to 500 μL, and more preferably 200 to 300 μL.

Two types of waste liquid structures for the storage section 12 may be prepared, for example, one for a small amount of waste such as the detection reagent 15, and the other for a large amount of waste such as the sealing liquid 17. Alternatively, the two types of waste liquid structures may have a double structure. The waste liquid structure for a small amount of waste may have the outlet 10 of the flow path 9 formed in a V-shape so as to store a small amount of waste liquid.

The waste liquid storage section 12 may be provided with a lid to prevent the waste liquid from leaking out. The structure serving as a lid may be made of, for example, plastic or metal. Further, the structure serving as a lid may be made of a seal such as a film. Further, the structure serving as a lid may be formed of a sponge made of polyurethane, polyvinyl alcohol, or the like or a thermosetting resin such as amino resin or melamine resin so that the waste liquid storage section 12 may be covered with the lid by subsequently applying heat. In the waste liquid storage section 12, an absorbent may be provided to absorb the waste liquid.

Although FIGS. 1 to 3 show an example in which the waste liquid storage section 12 is located in the vertical direction of the flow path (above the flow path 9), the waste liquid storage section 12 may be located in the horizontal direction of the flow path. That is, the waste liquid storage section 12 may be disposed on the side surface of the analysis device 2 shown in FIGS. 1 to 3. When the waste liquid storage section 12 is disposed in the horizontal direction of the flow path, the sample which is not stored in the micropore array may be moved in the direction of the observation surface (horizontal direction).

When the waste liquid storage section 12 is disposed in the horizontal direction of the flow path, the analysis device 2 may be low profile (reduced in thickness), providing high portability and reducing interference with an apparatus.

Note that, positioning of the waste liquid storage section is not limited to the vertical direction of the flow path and the horizontal direction of the flow path. The waste liquid storage section may be positioned obliquely above the flow path or obliquely below the flow path as long as it does not disturb analysis or detection of the sample, and the example of the present embodiment is merely illustrative.

Since the base 3 and the cover 7 are connected to each other as described above, the analysis device 2 according to the present embodiment includes the plurality of receiving sections 6, the flow path 9, the liquid introduction section 11, and the waste liquid storage section 12.

The beads 14 are bindable with the analysis target and have a specific gravity larger than that of a solvent of the mixed solution of the sample 16 and the reagent 15. Beads 14 that can be efficiently dropped into the receiving sections 6 by gravity may be selected. For example, beads 14 containing metal may be used as the beads 14 for capturing analysis target. For example, the beads 14 may contain at least one metal selected from the group consisting of ferrite, iron, copper, gold, silver, platinum, nickel, cobalt, tin, zinc, magnesium, calcium, and aluminum.

Further, the beads 14 containing ferrite or magnet may be used to guide the beads 14 to the receiving sections 6 by magnetic force. The magnetic beads may be used so that the beads 14 can be attracted into the receiving section 6 by magnetic force.

Further, the beads 14 made of a resin may be selected as beads for capturing the analysis target so that the beads 14 can be trapped in the receiving section 6 by means of centrifugal force. The resin as a material for the beads 14 may be selected as appropriate from a group consisting of polystyrene, polyethylene, polyester, and a polyterephthalate.

When the analysis target is DNA, DNA probe labels may be provided on the surface of the beads 14. When the analysis target is protein, antibody labels may be provided on the beads 14.

The beads 14 may have any shape as long as the beads 14 can be received in the receiving sections 6, and the bead 14 preferably has a shape different from the opening shape of the receiving section 6 as viewed facing the opening of the receiving section 6 when one bead 14 is housed in each receiving section 6.

The analysis target substances are dispersed in a solvent. Accordingly, the analysis target, when dispersed in the solvent, does not readily enter the receiving section 6. In the present embodiment, the beads 14 having a specific gravity larger than that of a solvent can capture the analysis target so that the analysis target can be received in the receiving section 6 together with the bead 14.

The bead 14 may be of any size as long as it can be fixedly accommodated in the receiving section 6. Preferably, the bead 14 has a size in the range from 0.1 μm to 20 μm. The reason for this is that it would be difficult to optically detect the bead 14 when the bead 14 is smaller than 0.1 μm. Further, when the bead 14 is larger than 20 μm, the surface area of the bead 14 is reduced. This may cause a decrease in hybridization efficiency due to the reduced number of contact between nucleic acids and the probes for capturing nucleic acids on the beads 14.

That is, when the beads 14 have a size in the range from 0.1 μm to 20 μm, optical observation can be facilitated and high hybridization efficiency can be achieved. Further, the bead 14 may have a size other than the above preferred range (0.1 to 20 μm), corresponding to the shape of the receiving section 6.

The reagent 15 (see FIG. 2) is supplied from the liquid introduction section 11 of the analysis device 2 through the flow path 9 into the receiving section 6. The reagent 15 includes enzyme and a buffer solution.

The enzyme included in the reagent 15 is selected according to the biochemical reaction. For example, when the analysis target is nucleic acid, it is selected to perform a biochemical reaction such as an enzyme reaction to a template nucleic acid associated with the analysis target. The biochemical reaction to a template nucleic acid is, for example, a reaction which causes signal amplification in the presence of the template nucleic acid. The reagent 15 is selected according to a method that can detect nucleic acids, for example. Specifically, examples of the reagent 15 of the present embodiment include the reagent 15 used for the Invader (registered trademark) method, LAMP (trademark) method, TaqMan (registered trademark) method, a fluorescence probe method and other methods.

For example, when a specific gene is an analysis (detection) target, the template nucleic acids thereof or part of the template nucleic acid is an analysis target.

The buffer solution is a liquid including various additives dissolved in a solvent so as to promote enzymatic reaction while the samples 16 are mixed in the reagent 15. The composition of the buffer solution may be selected as appropriate from known compositions depending on the types of biochemical reaction.

Further, the reagent 15 may contain additives such as surfactant. By adding a surfactant to the aqueous reagent 15, each bead 14 can be readily received in each receiving section 6 by re-dispersing the beads 14. In so doing, the mixed solution may be stirred by a pipette to prevent further aggregation of the beads 14.

Further, an additive for preventing deterioration of fluorescence to be detected may be included in the reagent 15.

For example, fluorescence may be deteriorated when affected by active oxygen. Accordingly, for preventing such deterioration, a scavenger reagent or glucose oxidase may be added to the reagent 15.

The reagent 15 necessary for reaction may be filled in a bottle. However, using the reagent 15 in the same bottle for a plurality of times may cause contamination, leading to error analysis. In order to solve this problem, a single-use amount of the reagent 15 can be filled in a bottle and the bottle may be disposable. The bottle may be of any shape, and configured such that the reagent 15 is used by opening a cap, or the reagent 15 is dispensed by peeling a seal, or the reagent 15 is suctioned by piercing a tip or the like into a lid.

Further, for preventing contamination of the reagent 15, the reagent 15 may be supplied to the receiving section 6 instead of being filled in a bottle or the like. When the reagent 15 has been supplied to the receiving section 6, the reagent 15 may be dried and solidified, or the reagent 15 in the form of liquid may be supplied to the receiving section 6, which is closed with a lid to prevent evaporation. Although the filling amount of the reagent 15 is not specifically limited, the concentration can be adjusted according to the amount of the sample 16 to be mixed. For example, when an equal amount of the sample 16 is mixed with the reagent 15, the concentration of the reagent 15 can be twice the final concentration.

The sealing liquid 17 (see FIG. 3) is liquid supplied to the flow path 9 to individually seal the receiving sections 6. The sealing liquid 17 has a composition that does not mix with the sample 16 and the reagent 15. When the sample 16 and the reagent 15 are aqueous, the sealing liquid 17 is preferably oil-based. The sealing liquid 17 is a solution that can be supplied from the liquid introduction section 11 into the flow path 9. The oil-based sealing liquid 17 may be, for example, mineral oil, silicone oil, chloroform, squalene, hexadecane, or fluorinated liquid such as FC-40.

In the present embodiment, the specific gravity of the sealing liquid 17 is larger than the specific gravity of the reagent 15 except for the beads 14.

The sealing liquid 17 may not be an oil-based liquid. Examples of the sealing liquid 17 which is not oil-based liquid include a thermosetting resin or a photosetting resin. These sealing liquid 17 have viscosity, for example, in the range from 0.5 to 500 CS, preferably from 0.7 to 200 CS, and more preferably from 0.8 to 100 CS.

The sealing liquid 17 may contain an additive in order to reduce autofluorescence. Since fluorescence or phosphorescence is used in a method described below, it is preferred that the sealing liquid 17 does not substantially include autofluorescence. The term "not substantially include autofluorescence" as used herein refers to the fact that the sealing liquid 17 does not include any autofluorescence at any wavelength used for detection of the experiment result, or may include autofluorescence that is insignificantly weak and does not affect detection of the experimental result. For example, autofluorescence which is not more than one-half or not more than one-tenth of the fluorescence of the analysis target can be regarded as being insignificant for the detection of experiment results.

Examples of the additive added to the sealing liquid 17 include organic and inorganic pigments. Specifically, black pigments include carbon black, acetylene black, and iron black; yellow pigments include chrome yellow, zinc yellow, yellow ocher, Hansa yellow, permanent yellow, and benzine yellow; orange pigments include orange lake, molybdenum orange, and benzine orange; red pigments include red iron oxide, cadmium red, antimony vermilion, permanent red, Lithol red, lake red, brilliant scarlet, and thioindigo red; blue pigments include ultramarine, cobalt blue, phthalocyanine blue, ferrocyanide blue, and indigo; green pigments include chrome green, viridian naphthol green, and phthalocyanine green.

Further, in addition to the pigment dispersed in the sealing liquid 17, various dyes dissolved in the sealing liquid 17 may also be used as the colored component. The examples of the dye are listed below. Specifically, a direct dye, basic dye, cationic dye, acidic dye, mordant dye, acidic mordant dye, sulfur dye, vat dye, naphthol dye, disperse dye, reaction dye, and the like can be used. In particular, disperse dye is often used for dyeing of the resin.

A surfactant may be added to the sealing liquid 17. By adding a surfactant to the sealing liquid 17, sealing efficiency can be improved. The surfactant may be of any type or concentration, and can be determined depending on the miscibility with the reagent 15 or a material of the micropore array layer 5. The concentration is preferably in the range from 0.001% to 10%.

Further, as the sealing liquid 17, an oil-based sealing liquid 17 or a sealing liquid 17 made of a thermosetting resin or a photosetting resin may be used together. For example, after an oil-based sealing liquid is supplied, a sealing liquid made of a thermosetting resin can be supplied to reduce noise during fluorescence observation.

An analysis method in the present embodiment will be described by using an example which uses the above analysis device 2. The analysis method may not necessarily use the above analysis device 2.

In the example described below, the analysis target is nucleic acid, and the concentration of nucleic acid is measured.

First, the beads 14 are mixed with the sample 16 which contains the analysis target.

In the present embodiment, nucleic acids, which are analysis targets, are captured by the beads 14 by hybridization. The nucleic acids contained in the sample 16 also include nucleic acids other than the analysis targets. Since the beads 14 are modified by probes complementary to nucleic acids, which are analysis targets, the nucleic acid of the analysis targets can be specifically captured. The probes for capturing nucleic acid bound to the beads 14 can be selected as appropriate from nucleic acids such as DNA, RNA, BNA, and PNA that form complementary strands with the target nucleic acids.

In the hybridization process of target nucleic acids with probe portions of the beads 14 to which probes for capturing nucleic acids of a target sequence are bound, it is possible to separate target nucleic acids from double-strand to single strand in order to efficiently capture the target nucleic acids by the beads 14, or to release self-hybridization in the target nucleic acids. The method for these can be selected from alkaline denaturation methods, thermal denaturation methods, and methods using enzyme. As thermal denaturation methods, a thermal cycler can be used, for example. The thermal cycler is used to efficiency capture the nucleic acids of a target sequence by the beads 14.

When a thermal cycler is used to hybridize the target nucleic acids and the probes on the beads 14, a tube (container) having a structure that facilitates thermal convection can also be used to further increase hybridization. As the structure that facilitates thermal convection, for example, the lower part of the tube can be formed to have a reduced thickness and the upper part of the tube can be formed to have an increased thickness to thereby vary heat distribution in a solution in the tube to contribute to thermal convection. Alternatively, a plurality of materials may be selected as a material for one tube to thereby vary heat distribution in a solution to contribute to thermal convection.
For example, the lower part of the tube may be made of a material with high heat-conductivity, and the upper part of the tube may be made of a material with low heat-conductivity.

Further, for example, a plurality of buttons can be provided in one apparatus so that each button can be used to adjust temperature required for reaction. Alternatively, instead of providing a thermal cycler or a hotplate with a plurality of buttons, a plurality of hotplates each has been set to a required temperature may be provided to perform hybridization. Alternatively, hybridization can be performed by a single hot plate while changing temperature.

Further, in the hybridization process of target nucleic acids with probe nucleic acids on the beads 14, hybridization efficiency can be improved by stirring instead of heating. The stirring speed can be selected as appropriate from 600 rpm to 3000 rpm, and is preferably in the range from 600 rpm to 2000 rpm in order to prevent damage to the nucleic acids. Further, stirring period is not specifically limited, and stirring can be performed overnight if the hybridization efficiency is low.

When hybridization is performed with stirring, a hybridization solution is introduced into a container with a magnet, and rotated by using a hot plate stirrer or a normal stirrer for reaction. Thus, hybridization reaction can be performed while mixing a hybridization solution. In stirring, conditions in which the Reynolds number is increased, that is, a turbulent flow is generated are selected to promote stirring and re-dispersion of the beads 14. In the hybridization with stirring according to the present embodiment, the Reynolds number is preferably in the range from a few hundreds to approximately 1000.

After the analysis target is captured by the beads 14, the beads 14 are collected and mixed with the reagent 15.

For example, when magnetic beads are used, the beads 14 are collected to the bottom of the tube by using a magnetic stand after hybridization, and then the supernatant is removed by a pipette. In an alternative method, a solution including the beads after hybridization is suctioned by a pipette tip. Then, while the magnet is put onto the pipette tip to capture the beads 14, only the liquid is discharged. Subsequently, the detection reagent 15 is suctioned, and the beads 14 and the reagent 15 are stirred while the magnet is removed. Then, the reagent 15 including the beads 14 is introduced into a detection device. The magnet used may be put onto the side surface of the pipette tip. Alternatively, a donut shaped magnet which can be attached around the pipette tip may be used.

In the case where the beads 14 other than magnetic beads, e.g., silica beads, are used, the beads 14 are collected by centrifugal separation and mixed with the detection reagent 15. In this case, a filter having a hole diameter smaller than the diameter of the beads 14 may be used to separate the beads 14.

For removing substances nonspecifically bound to the beads 14, the beads 14 may be cleansed by using a cleansing solution.

After the beads 14 that have captured the analysis target are mixed with the detection reagent 15 for detecting the analysis target, the mixed solution is introduced into the liquid introduction section 11 of the analysis device 2 as shown in FIG. 2, for example, manually.

When a solution including the analysis target is introduced into the empty liquid introduction section 11 of the analysis device 2, a small amount of the solution that fills only part of the flow path 9 can be introduced. Then, the sealing liquid 17 can be introduced thereafter to allow the solution to be introduced into the receiving section 6 located at a position where the solution has been already introduced. The solution which overflows from the receiving section 6 is urged by the sealing liquid 17 to fill part of the flow path 9 adjacent thereto. The solution is further introduced into the receiving section 6 located at this position, while the solution urged by the sealing liquid 17 overflows from the receiving section 6 and further fills part of the flow path 9 adjacent thereto. By repeating this process, a small amount of the solution can be efficiently introduced into the receiving sections 6.

The method for introducing the mixed solution of the sample 16 and the reagent 15 into the receiving section 6 is not limited to the above method.

For example, the analysis device 2 can be filled with a pre-buffer solution in advance, and then the mixed solution of the sample 16 (beads 14 that have captured the analysis target) and the reagent 15 can be introduced from the liquid introduction section 11 to replace the pre-buffer solution. Accordingly, the mixed solution is introduced into the receiving sections 6.

The mixed solution can also be introduced into the receiving section 6 by introducing the solution into the empty analysis device 2 from the liquid introduction section 11, and they applying a centrifugal force to the analysis device 2.

The mixed solution can also be introduced into the receiving section 6 by continuously introducing, from the liquid introduction section 11, the solution or a pre-buffer solution of the amount that allows air in the analysis device 2 to be dissolved.

When a certain liquid is introduced into the analysis device 2 in advance, the inlet 8 and the outlet 10 of the flow path 9 are sealed. Examples of the sealing include sealing by lid, and sealing the top of the cover 7 with a film seal.

Further, the beads 14 and the reagent 15 are not mixed, and the beads 14 can be initially introduced into the receiving section 6 of the analysis device 2, and then the reagent 15 can be supplied into the analysis device 2. In this case, when the beads 14 and the reagent 15 come into contact with each other in the receiving section 6, biochemical reaction can be started.

An operation for supplying the mixed solution from the liquid introduction section 11 into the flow path 9 can be performed by a pipette or a dispenser. Further, a pipette tip that has measured the solution can be pierced into the inlet 8, and then the pipette tip can be removed from the pipetter to thereby allow the liquid to be spontaneously introduced. Accordingly, unlike manual operation, the liquid can be supplied at a uniform speed. In this case, the level of the solution in the pipette tip is preferably located above the flow path 9 of the analysis device 2. Further, the amount of solution is preferably the amount that can fill the analysis device 2 or more, but not limited thereto.

After the mixed solution of the beads 14, the reagent 15, and the sample 16 including the analysis target is introduced into the flow path 9 of the analysis device 2, the sealing liquid 17 is introduced into the flow path 9 as shown in FIG. 3. Accordingly, the receiving sections 6 are individually sealed. The beads 14 received in the receiving sections 6 remain in the receiving sections 6 due to gravitational force, and the reagent 15 received in the receiving sections 6 remains in the receiving sections 6 since the inside the receiving sections 6 is hydrophilic.

The sealing liquid 17 is continuously introduced into the flow path 9 until the sealing liquid 17 enters the waste liquid storage section 12. Accordingly, the excess of the reagent 15 and the sample 16 in the flow path 9 is urged into the waste liquid storage section 12.

In the waste liquid storage section 12, the mixed solution of the reagent 15 and the sample 16 overlies the sealing liquid 17 since the sealing liquid 17 has a specific gravity larger than that of the reagent 15 except for the beads 14.

After the receiving sections 6 are individually sealed by the sealing liquid 17, processing to cause biochemical reaction such as signal amplification is performed. Accordingly, a fluorescence signal becomes detectable when the analysis target and the reagent 15 are appropriately received in the receiving section 6. Depending on the types of biochemical reaction, phosphorescence instead of fluorescence may be detected.

As an example of the signal amplification reaction, performing an Invader reaction in the receiving sections 6 will be described.

The Invader reaction is an isothermal reaction which is performed for a certain period of time under a predetermined temperature condition. Accordingly, when performing the Invader reaction, the analysis device 2 is left at rest in a chamber at a constant temperature. Further, the analysis device 2 may be left at rest on a hot plate with a constant temperature. A heating device such as a hot plate which is used for heating at a reaction temperature may be a device with a timer.

In order to improve the ease of fluorescence detection, a reaction time for the detection reagent 15 can be increased, or a fluorescence substance concentration in the detection reagent 15 can be increased. Alternatively, a sensitivity of the detection device can be increased.

When the beads 14 are used for the Invader reaction, fluorescence beads that emit fluorescence with a wavelength different from that generated by the reaction between the analysis target and the detection reagent 15 may be used as the beads 14. In this case, the beads 14 can be counted by fluorescence detection.

In detection of fluorescence or phosphorescence, the temperature of the analysis device 2 can be appropriately modified to an optimal temperature to thereby adjust the light intensity to be optimal for detection. Since the fluorescence intensity of the fluorescent substance increases with an increase in temperature, signal values can be improved by controlling the temperature during fluorescence measurement.

The detection of fluorescence or phosphorescence can be performed by using a device such as a fluorescence microscope.

The fluorescence microscope used in the present embodiment is connected to a camera for capturing a microscopic image and a computer system in which software for analyzing the microscopic image captured by the camera is installed.

In the present embodiment, a microscopic image is captured with the plurality of receiving sections 6 included in the field of view. Then, the number of receiving sections 6 in which signal amplification reaction occurs is counted based on the presence or absence of fluorescence in the image. Accordingly, among the all receiving sections 6, the number of receiving sections 6 that contain the beads 14 that have captured the analysis target can be counted.

The observation of fluorescence using the analysis device 2 can be performed by setting the analysis device 2 directly on the microscope. However, in the case of a small analysis device 2, a tool having a supporting rod or the like is used to prevent the analysis device 2 from falling off from a stage of the fluorescence microscope. Alternatively, the tool may be a tape or the like.

When the desired targets to be observed are layered in the Z direction of focus (optical axial direction of objective lens), the fluorescence microscope may have an image selection function and recognition function as well as normal auto-focusing function for selecting the target and automatically focusing thereon. For example, in order to focus on the beads 14 in the receiving sections 6, the focus is first placed on the receiving sections 6 and then slightly moves upward and downward from that position to locate the beads 14.

Alternatively, image processing and image recognition algorithms may be used for focusing on the beads 14.

The image processing may include, for example, contrast enhancement or edge enhancement.

On the other hand, for the image recognition, it is preferred to prepare a database of registered images, especially images showing how the beads 14 are observed with focus blur, non-uniform illumination, or smudges, since this improves matching accuracy. More preferably, the positions of the beads 14 and the receiving sections 6 on the Z axis of the focus direction are stored with transmitted illumination, phase difference, and edge enhancement so that the beads 14 and the receiving sections 6 can be confirmed in the fluorescence image when illumination is switched to fluorescence. This mechanism is desirable since the accuracy is further improved.

It is also possible to vertically elongate the receiving section 6 to thereby increase an area that can be focused to locate the beads 14.

After the lens position of the fluorescence microscope is set by using a reference member for focus adjustment, the analysis device 2 to be measured is set on the fluorescence microscope. It is also possible to reduce restrictions in the fluorescence microscope by providing vertically elongated receiving sections 6 to expand the area that can be focused. When the fluorescence filters of a fluorescence cube have different thicknesses, combinations of the filters are determined so that each fluorescence filter has the same optical path length or the objective lens is slightly moved, adjusting for each fluorescence cube, to obtain focus.

Alternatively, an optical element having a variable optical path length that is offset by a filter can also be used for adjustment.

A wide area image is captured by using a low magnification lens, and the beads 14 and the bright receiving sections 6 are counted. The demand of autofocusing for each shot can be reduced by correcting parallelism of a subject with high accuracy. In addition, the range in which a subject is in focus (depth of field) can also be expanded by providing vertically elongated receiving sections 6.

Excitation light irradiated on the analysis device 2 can be increased to perform measurement in a short period since a long exposure time is not required even if fluorescence is weak. Further, when excitation light irradiated on the analysis device 2 is decreased, discoloration of fluorescence can be reduced although the time required for exposure increases.

The light source used for a fluorescence microscope may be a mercury lamp, light emitting diode, or the like.

Recently, LED light sources are being marketed for fluorescence microscopes. Although the currently available LEDs do not provide a wide variety of wavelengths and do not always serve as a strong excitation light source compared to mercury lamps, they can provide strong excitation light at the excitation wavelength if the wavelength matches. In this case, they can be a light source producing strong fluorescence but small fluorescence degradation, and shorten the exposure time.

Selecting an appropriate filter that cuts off the UV-side and has a wide excitation light range has the same effect as increasing the intensity of excitation light, which ensures reduction of exposure time.

Imaging processing such as integration imaging is performed to ensure counting with a 5× magnification objective lens.

For example, if imaging is performed by a camera with approximately 4 million pixels, the resolution is increased by changing to 10 million pixels.

It is also possible to determine the imaging condition on the basis of the imaging result of a low magnification objective lens. For example, if the brightness of the entire image is high when imaging is performed with a low magnification objective lens, the number of image captures can be reduced without observing many receiving sections 6 since the target density is high. If the overall brightness is low when imaging is performed with a low magnification objective lens, the number of image captures may be increased since the target density is low. After imaging at low magnification, imaging can be switched to high magnification.

In imaging using a fluorescence microscope, the beads 14 and fluorescence can be independently imaged. Excitation light or fluorescence with various different wavelengths can also be used for imaging. The entire inclusion ratio of the beads 14 can be determined by measuring only a single field of view (or several fields of view). In this case, measurement time can be shortened. Alternatively, on the assumption that the inclusion ratio of the beads 14 is constant regardless of the number of experiments, the default inclusion ratio can be used without performing measurement. In this case, measurement time can be further shortened.

The camera for imaging a microscopic image can be selected as appropriate from known cameras having an image sensor such as CCD or CMOS. Although a field of view is narrow in a microscope with 10× magnification, a wide field of view can be ensured by using a camera having a large CMOS sensor. Since the magnification decreases, the field of view increases.

The number of gradations in imaging can be lowered to reduce the data volume. Alternatively, the data volume can also be reduced by increasing the number of gradations only for a necessary portion or by removing unnecessary portions from the imaging area.

When a camera has a performance of approximately 12 bit gradation, calculation can be performed with 14 bits to avoid canceling of digits. In addition, as for the final result only, the gradation can even be 8 bit. Further, a dedicated server with the redundancy of RAID 1 to 5 can be used to store the data in this server.

In the analysis using a microscopic image, whether the receiving sections 6 emit fluorescence or not can be determined on the basis of a predetermined threshold. A ratio of the fluorescence intensity of the receiving sections 6 to that of the non-luminescent portion can be represented as an intensity ratio so as to apparently remove unevenness of fluorescence intensity of the receiving sections 6.

It is also possible to perform correction in advance since the excitation light or the transmissivity of the lens on a camera-side are low in the peripheral area. In that case, the light reduction amount can be corrected by software. The correction is performed by imaging a standard reflector, which is a standard subject used as a subject for a reflection ratio, made of a hardened powder of barium carbonate or the like. Alternatively, another correction method can be used, in which the center of image, that is, the image at the center of lens is combined to calculate the ratio of light reduction at the peripheral area.

Measures for excluding images in which foreign substances or missing is present are also required. The image processing can be performed to remove an illuminating dot with the same size as the receiving section 6. For example, when the size of the receiving section 6 is 5 μm, an illuminating dot with the size of less than 5 μm or more than 5 μm is not regarded as the receiving section 6 and can be excluded from the measurement target.

The positions of the plurality of receiving sections 6 in the microscopic image are pre-stored as a pattern in a computer system associated with the microscope apparatus. Using colored sealing liquid 17 can prevent autofluorescence of the analysis device 2 and irregular reflection of the analysis device 2.

In measurement of a reference (for calibration) of autofluorescence, a solid film (film formed on the entire surface) for calibration can be first measured to determine the focal distance before measurement of the analysis device 2. Further, autofluorescence can be reduced by masking unnecessary portions so that they are not exposed to excitation light during excitation exposure.

When satisfying the conditions necessary for measurement, the computer system can automatically calculate analysis results of the analysis target, for example, mutation rate, concentration, and the like if the analysis target is nucleic acid. If at least one condition is not satisfied, the result is regarded as a reference and the unsatisfied condition is displayed to thereby prevent an erroneous result from being automatically provided. For example, if all the receiving sections 6 are bright or all the receiving sections 6 are dark, this can be regarded as an error since the comparison cannot be performed as there are no places where the fluorescence value in the receiving sections 6 in which biochemical reaction occurs is higher by n times than the fluorescence value in the receiving sections 6 in which biochemical reaction does not occur.

Further, an error can be determined if the percentage of the receiving sections 6 showing the fluorescence intensity of a specified value or more is 10% or more, for example. In particular, the conditions for establishing analysis data can be specified, and the determination criteria can be provided accordingly.

Further, data regarding errors can be stored to establish a reference database of errors. Accordingly, a program that always requests confirmation for data where it is difficult to detect an error can be provided. Further, a mechanism for recognizing the probability of error may also be provided. Further, another method is possible in which data indicating a value higher than the determination criteria by twice the specified value is excluded from the receiving sections 6 in which biochemical reaction does not occur and the receiving sections 6 in which biochemical reaction occurs (that is, this data is ignored).

As a mechanism for irradiating minimum excitation light, the excitation light can be turned off when not in operation and the previous image is displayed, or the excitation light can be gradually increased from a low level. Even if the excitation light is turned off at a high level, it can start from a low level each time a sample is changed. Alternatively, in the case of strong light, a camera captures an image at the same time as turning on of the excitation light.

The sensitivity of the camera starts from the maximum exposure or approximately 1 second exposure (0.1 second, 5 second, or 10 second is also possible for an initial setting). For this period, the excitation light cannot be increased.

Alternatively, an image can be captured, first without the beads 14 and then with the beads 14, so that the image of the beads 14 can be extracted on the basis of a difference of these images. It is desired that images of the receiving sections 6 without the beads 14 are registered as reference images, including an image with slightly deviated focus, an image focused at the center but slightly skewed, generating blur with positive deviation on the right side and negative deviation on the left side, and an image with non-uniform illumination.

Alternatively, reference images of the beads 14 can be registered so that the beads 14 can be extracted and counted by using an image processing algorithm for determining similarity. By collecting a number of examples as image database, a match ratio can be increased. Depending on the wavelength of fluorescence used for counting the receiving sections 6 which emit fluorescence, another fluorescence wavelength may be easily counted. Alternatively, it is also possible to use beads 14 detectable by another wavelength.

As described above, the analysis device 2 according to the present embodiment can be used to count the receiving sections 6 that emit fluorescence during fluorescence observation due to occurrence of biochemical reaction in the receiving sections 6.

An operation of the analysis device 2 according to the present embodiment will be described.

In the present embodiment, there may be cases where the mixed solution and the sealing liquid 17 are stirred at a position adjacent to an interface 18 between the sealing liquid 17 and the mixed solution of the sample 16 and the reagent 15, and a solute in the mixed solution may migrate into the sealing liquid 17. The mixed solution of the sample 16 and the reagent 15, in which biochemical reaction which emits fluorescence occurs, are in a state that can emit fluorescence in response to irradiation of excitation light. Accordingly, if the excess of the mixture of the sample 16 and the reagent 15 is present at a position adjacent to the receiving section 6, it may be difficult to distinguish fluorescence caused by the excess and fluorescence in the receiving sections 6. Further, if the excess of the mixture of the sample 16 and the reagent 15 is mixed with the sealing liquid 17 and migrates to a position adjacent to the receiving section 6, it may also be difficult to distinguish fluorescence caused by the excess and fluorescence in the receiving sections 6.

On the other hand, in the present embodiment, the waste liquid storage section 12 and the receiving section 6 are separated from each other along the flow path 9 and the shortest distance therebetween is 2 mm or more. Accordingly, the interface 18 between the sealing liquid 17 and the mixed solution is sufficiently spaced from the receiving section 6. Accordingly, in the present embodiment, the solute which has been stirred or has migrated as described above is not likely to affect the biochemical reaction in the receiving sections 6. Further, although capable of emitting fluorescence in response to irradiation by excitation light, the solute which has been stirred or has migrated as described above is not likely to affect the measurement of fluorescence since it is sufficiently spaced from the receiving section 6. As a result, according to the analysis kit 1 and the analysis device 2 of the present embodiment, the reagent 15 stored in the waste liquid storage section 12 tends not to interfere with fluorescence observation in the receiving sections 6. Thus, highly reproducible analysis can be performed.

The analysis kit 1 and the analysis device 2 according to the present embodiment can be reduced in overall size since a separate device for collecting waste liquid is not required.

Further, in the analysis kit 1 according to the present embodiment, the specific gravity of the sealing liquid 17 is larger than the specific gravity of the reagent 15 except for the beads 14. Accordingly, after migrating into the waste liquid storage section 12, the excess of the mixed solution of the sample 16 and the reagent 15 is not likely to flow back from the waste liquid storage section 12 into the flow path 9.

Second Embodiment

Figure 4:
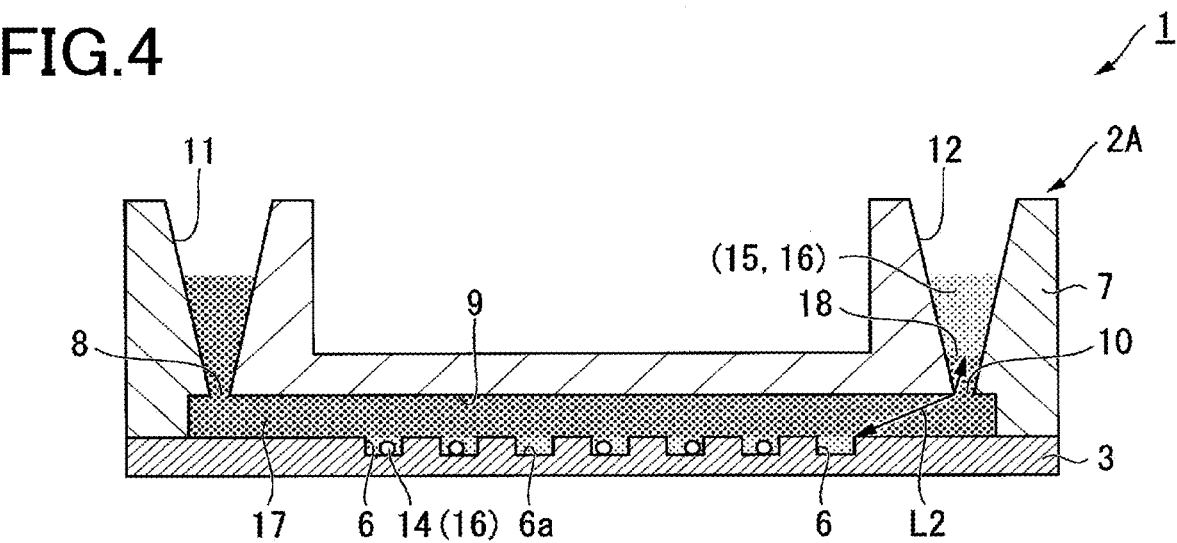
FIG. 4 is a schematic sectional view of an analysis device in an analysis kit according to a second embodiment of the present invention.

Next, a second embodiment of the present invention will be described. FIG. 4 is a schematic sectional view of an analysis device in an analysis kit according to the present embodiment.

In an analysis device 2A according to the present embodiment, the shortest distance between the waste liquid storage section 12 and the receiving section 6 may not necessarily be 2 mm or more along the flow path 9. Instead, in the analysis device 2A according to the present embodiment, the shortest distance between the interface 18, which is an interface between the sealing liquid 17 and the mixture of the sample 16 and the reagent 15, and the receiving section 6, is 2 mm or more along the flow path 9 when the sample 16 and the reagent 15 are stored in the waste liquid storage section 12 and overlie the sealing liquid 17. The position of the interface 18 corresponds to the amount of the sealing liquid 17 introduced from the liquid introduction section 11. That is, in the present embodiment, the amount of the sealing liquid 17 required for the shortest distance L2 between the interface 18 and the receiving section 6 being 2 mm or more along the flow path 9 is introduced from the liquid introduction section 11. For example, the shortest distance L2 between the interface 18 and the receiving section 6 in the present embodiment may be the shortest distance along a straight line which is bent to connect the receiving section 6 located at a position closest to the waste liquid storage section 12 among the plurality of receiving sections 6 and the interface 18 via the flow path 9 and the waste liquid storage section 12.

Further, the shortest distance between the interface 18 and the receiving section 6 may be a distance via the center of the flow path 9.

Introduction of the sealing liquid 17 may be performed manually. Further, introduction of the sealing liquid 17 may be performed by a system that automatically introduces a predetermined amount of the sealing liquid 17.

Although FIG. 4 shows an example in which the waste liquid storage section 12 is located in the vertical direction of the flow path (above the flow path 9), the waste liquid storage section 12 may be located in the horizontal direction of the flow path. That is, the waste liquid storage section 12 may be disposed on the side surface of the analysis device 2A shown in FIG. 4. When the waste liquid storage section 12 is disposed in the horizontal direction of the flow path, the sample which is not stored in the micropore array may be moved in the direction of the observation surface (horizontal direction). Even in the case of the waste liquid storage section 12 being disposed in the horizontal direction, the interface 18 may be formed between the mixture of the sample 16 and the reagent 15 and the sealing liquid 17, when stored in the waste liquid storage section 12, and the shortest distance between the interface 18 and the receiving section 6 is preferably 2 mm or more along the flow path 9.

When the waste liquid storage section 12 is disposed in the horizontal direction of the flow path, the analysis device 2A may have a low profile (be reduced in thickness), providing high portability and reducing interference with an apparatus.

Note that, positioning of the waste liquid storage section 12 is not limited to the vertical direction of the flow path and the horizontal direction of the flow path. The waste liquid storage section may be positioned obliquely above the flow path or obliquely below the flow path as long as it does not disturb analysis or detection of the sample, and the example of the present embodiment is merely illustrative.

Third Embodiment

Figure 5:
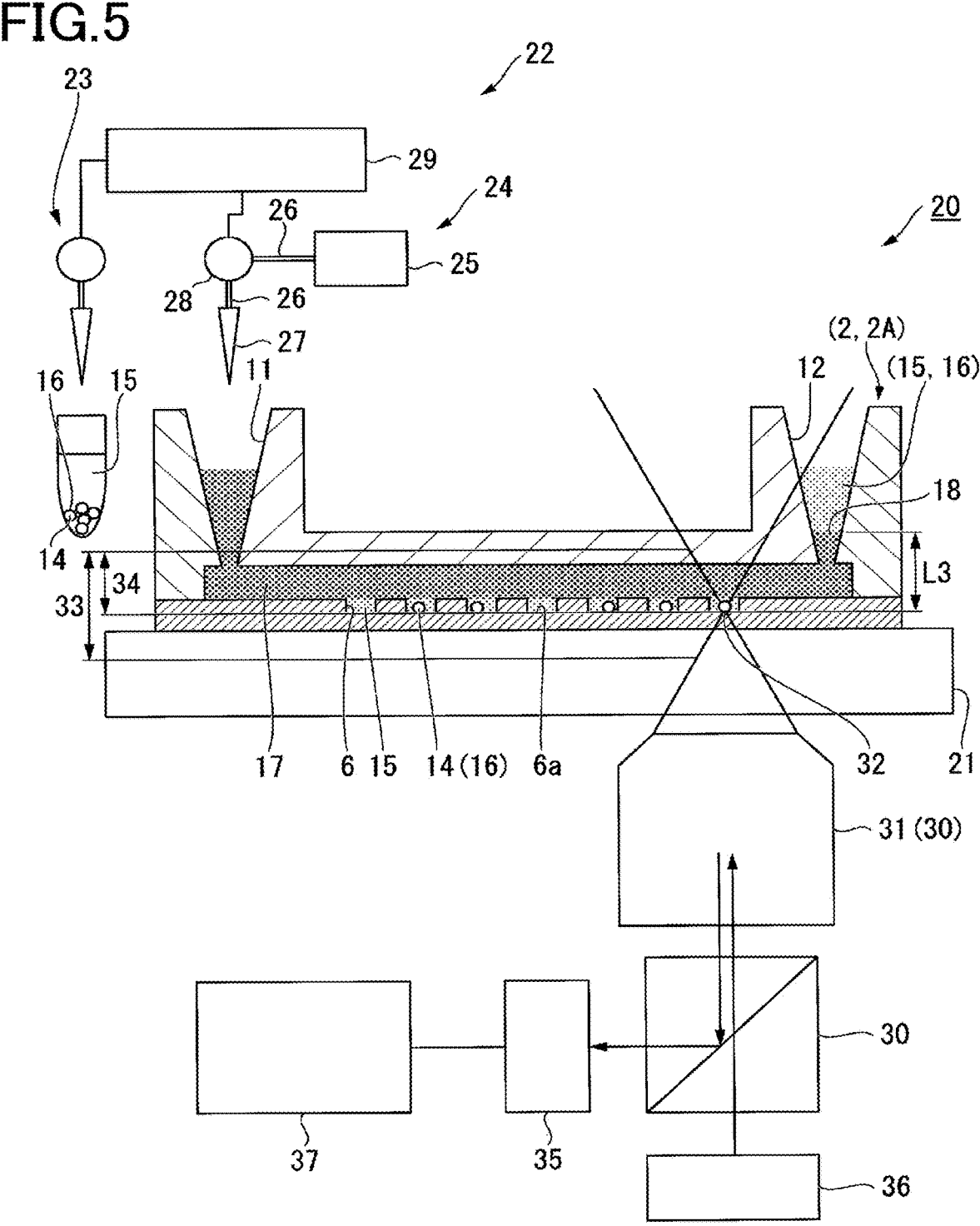
FIG. 5 is a schematic diagram of an analysis apparatus (analysis system) according to a third embodiment of the present invention.
Figure 6A:
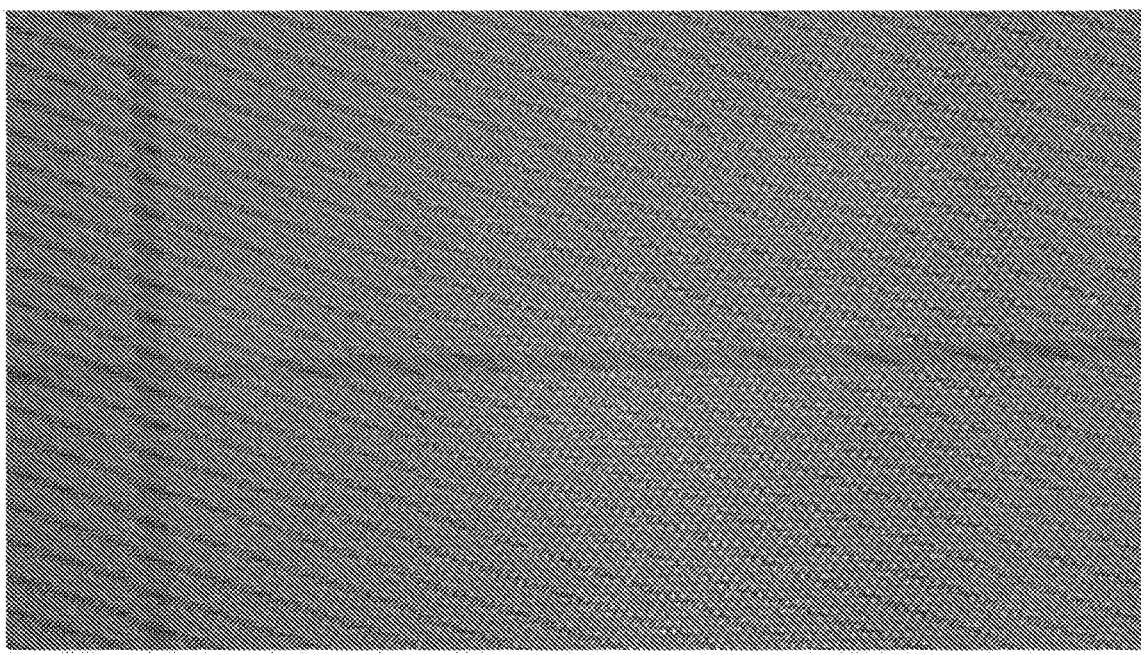
FIG. 6A is a fluorescence emission image of a device A in Example 1 in which a shortest distance L1 between a waste liquid storage section and a receiving section is 0 mm.
Figure 6B:
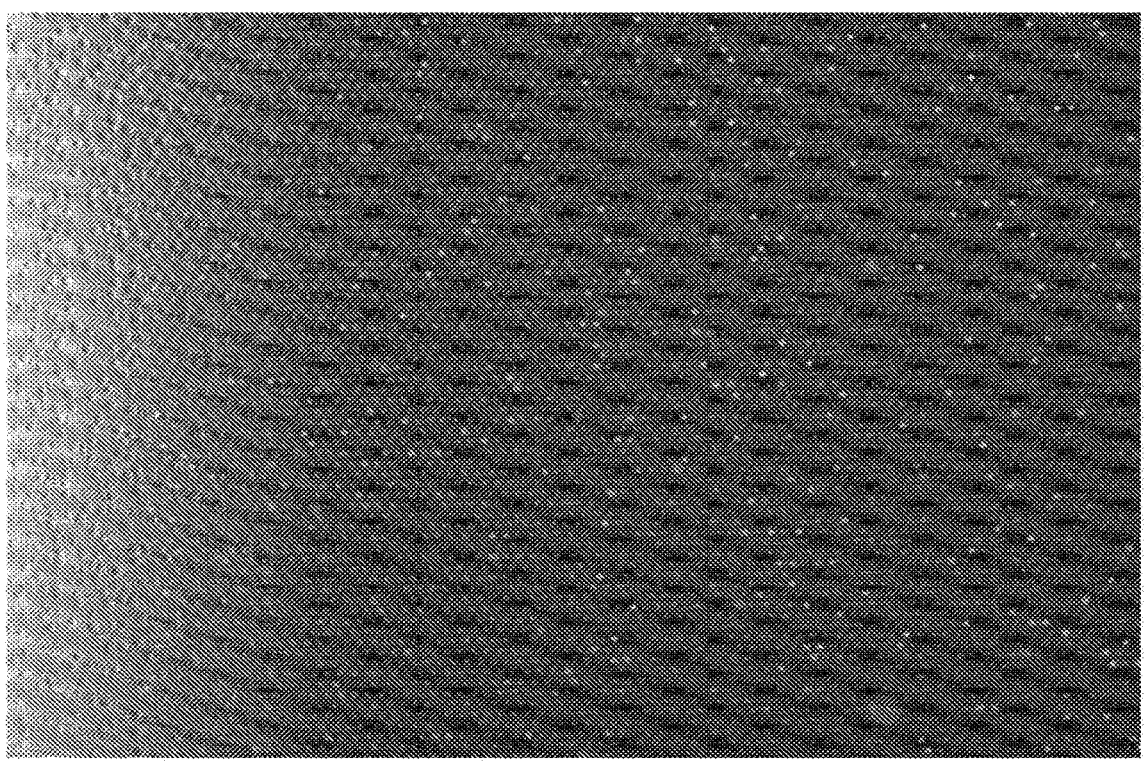
FIG. 6B is a fluorescence emission image of a device B in Example 1 in which the shortest distance L1 between the waste liquid storage section and the receiving section is 1 mm.
Figure 6C:
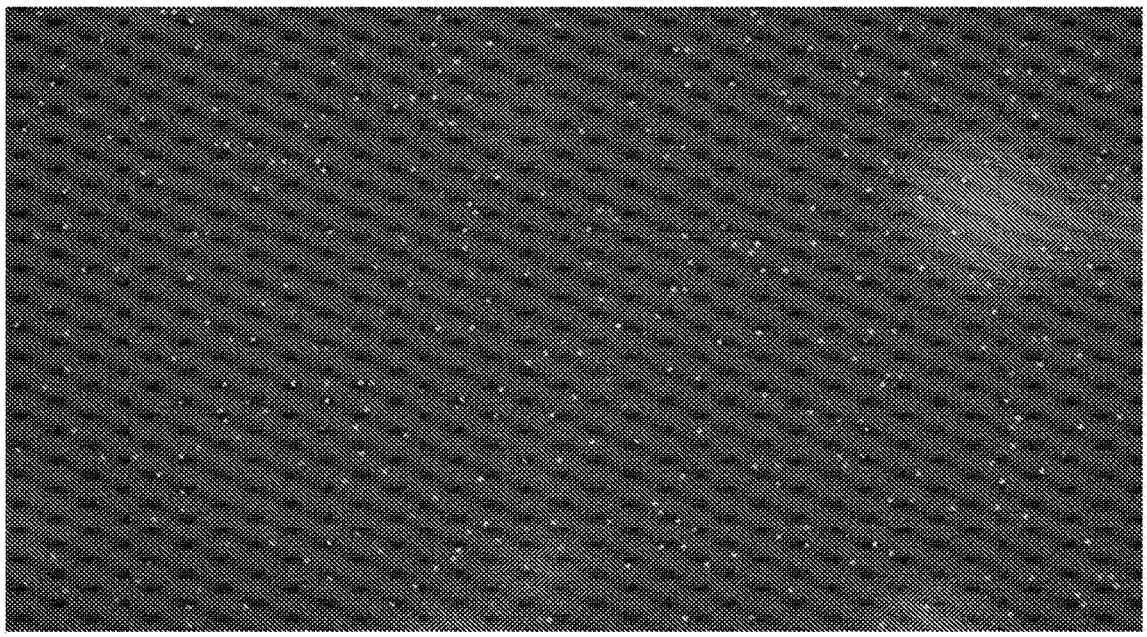
FIG. 6C is a fluorescence emission image of a device C in Example 1 in which the shortest distance L1 between the waste liquid storage section and the receiving section is 2 mm.
Figure 6D:
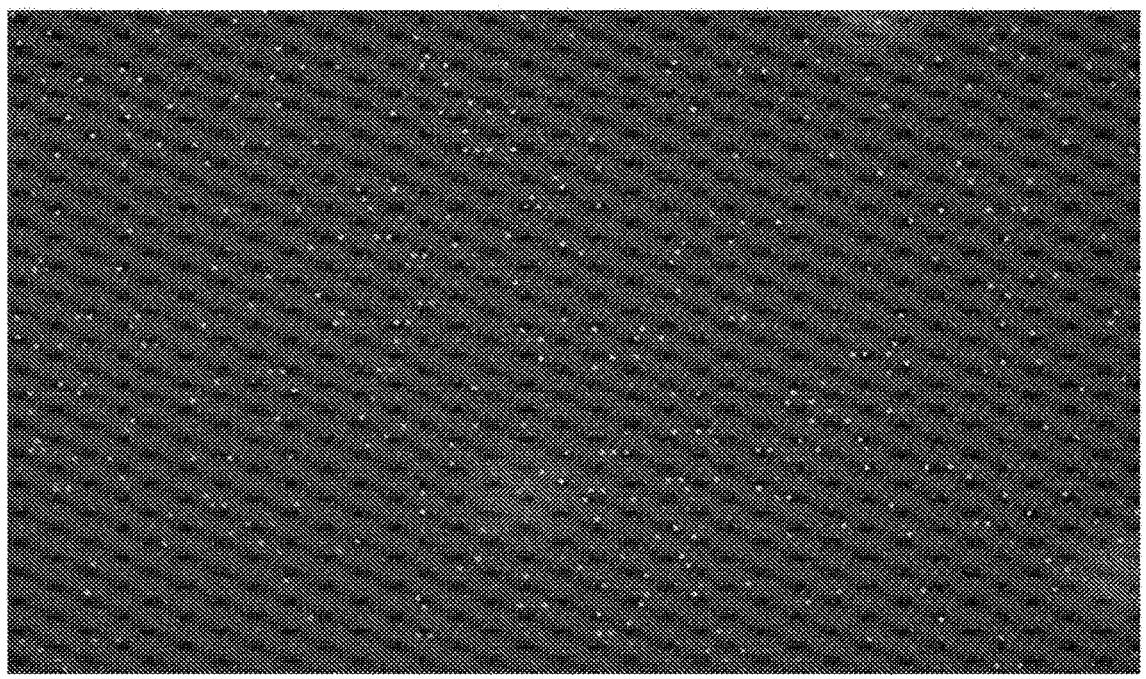
FIG. 6D is a fluorescence emission image of a device D in Example 1 in which the shortest distance L1 between the waste liquid storage section and the receiving section is 4 mm.
Figure 6E:
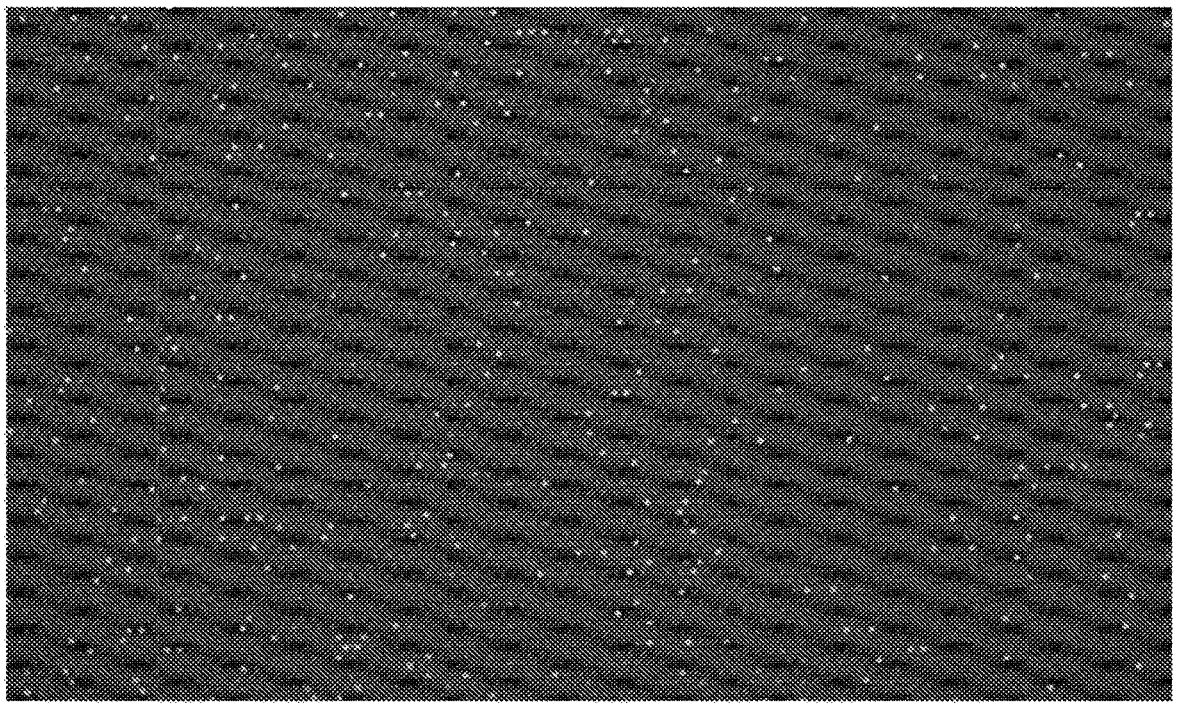
FIG. 6E is a fluorescence emission image of a device E in Example 1 in which the shortest distance L1 between the waste liquid storage section and the receiving section is 8 mm.

Next, a third embodiment of the present invention will be described. FIG. 5 is a schematic diagram of an analysis apparatus (analysis system) according to the present embodiment.

An analysis apparatus (analysis system) 20 according to the present embodiment shown in FIG. 5 is an apparatus which includes a system for performing automatic analysis using the analysis device 2 disclosed in the first embodiment and the analysis device 2A disclosed in the second embodiment. In the following description, a system for performing analysis by using the analysis device 2 disclosed in the first embodiment will be described. The analysis device 2A disclosed in the second embodiment is also available in the analysis system 20 of the present embodiment.

The analysis system 20 includes a stage 21 for carrying the analysis device 2, a liquid injection apparatus 22 for supplying various types of liquid into the analysis device 2 on the stage 21, an optical system 30 having an objective lens 31, an imaging section 35 connected to the optical system 30, a light source section 36 that emits excitation light onto the receiving sections 6 in the analysis device 2 via the optical system 30, and an analysis apparatus 37 that analyzes an image captured by the imaging section 35.

The liquid injection apparatus 22 includes a first liquid injection section 23 for supplying the sample 16 and the reagent 15 into the analysis device 2, and a second liquid injection section 24 for supplying the sealing liquid 17 into the analysis device 2.

For the first liquid injection section 23, a configuration of known dispensers can be appropriately selected. For example, the first liquid injection section 23 dispenses a mixed solution from a container (not shown), which accommodates a mixture of the sample 16 and the reagent 15, into the liquid introduction section 11 of the analysis device 2. Further, the first liquid injection section 23 may be linked to an apparatus, which is not shown, that performs hybridization processing disclosed in the first embodiment so that the first liquid injection section 23 mixes the beads 14 with the reagent 15 after the analysis target is captured by the beads 14, and introduces the mixed solution into the analysis device 2.

The second liquid injection section 24 includes, for example, a tank 25, a pipe 26, a nozzle 27, a pump 28, and a control unit 29. In the present embodiment, the tank 25 and the nozzle 27 are connected to each other via a tube, and a pump 28 is connected to the pipe 26. The control unit 29 determines an introduction amount of the sealing liquid 17 according to the configuration of the analysis device 2 and the optical system 30, and supplies the sealing liquid 17 from the tank 25 to the analysis device 2 via the nozzle 27 by actuating the pump 28.

The optical system 30 can set the focus of the objective lens 31 at a position adjacent to the bottom 6a of the receiving section 6 of the analysis device 2 on the stage 21, and is used to observe fluorescence in the each receiving section 6. In the present embodiment, the objective lens 31 or the stage 21 can be moved in the optical axial direction of the objective lens 31 to thereby allow a focal position 32 to be set at the bottom 6a of the receiving section 6. When the focal position 32 of the objective lens 31 of the optical system 30 is set at the bottom 6a of the receiving section 6, a certain area about the focal position 32 in the optical axis direction of the objective lens 31 (focal depth 33) can be favorably imaged.

The imaging section 35 includes an image sensor for detecting fluorescence which is transmitted to the imaging section 35 via the optical system 30. The imaging section 35 captures a fluorescence image and outputs the image to the analysis apparatus 37.

The light source section 36 emits excitation light, with a wavelength corresponding to the type of fluorescently labeled substance used in the biochemical reaction which uses the analysis device 2, onto the analysis device 2 via the optical system 30.

The analysis apparatus 37 determines the presence or absence of fluorescence in the receiving sections 6 of the analysis device 2 on the basis of the image captured by the imaging section 35. Further, the analysis apparatus 37 counts the number of receiving sections 6 that emit fluorescence among the receiving sections 6 of the analysis device 2, and calculates the concentration of the analysis target in the sample 16 introduced into the analysis device 2.

Of the control operations of the control unit 29 in the analysis system 20 according to the present embodiment, a control operation for determining the introduction amount of the sealing liquid 17 will be described.

The control unit 29 includes data on the shape of the analysis device 2 and data on the focal depth 33 of the objective lens 31.

The data on the shape of the analysis device 2 refers to the data at least indicating the position of the bottom 6a of the receiving section 6 in the optical axis direction of the objective lens 31, and the relationship between the amount of liquid introduced into the analysis device 2 and the level of the liquid in the waste liquid storage section 12.

The position of the bottom 6a may be determined using the top (surface on which the analysis device 2 is placed) of the stage 21 as a reference, for example.

The relationship between the amount of liquid introduced into the analysis device 2 and the level of the liquid in the waste liquid storage section 12 is stored as a table, calculation formula, and the like in the control unit 29.

The control unit 29 obtains an area of the region on which the objective lens 31 can be focused in the optical axial direction when the focal position 32 of the objective lens 31 is positioned at the bottom 6a of the receiving section 6, by using the information of the position of the bottom 6a of the receiving section 6 and the focal depth 33 of the objective lens 31. This region is determined in advance, for example, based on the lens data of the objective lens 31 so that the frequency of occurrence of erroneous determination in determination of the presence or absence of fluorescence by using the analysis apparatus 37 becomes not more than a predetermined threshold. The control unit 29 obtains a distance (fluorescence-obtainable distance 34) from the bottom 6a of the receiving section 6 to the boundary of the region on which the lens is focused in the optical axial direction of the objective lens 31 on the farther side from the objective lens 31.

On the basis of the data indicating the relationship between the amount of liquid introduced into the analysis device 2 and the level of the liquid in the waste liquid storage section 12, the control unit 29 determines the amount of the sealing liquid 17 to be supplied so that a distance L3 from the bottom 6a of the receiving section 6 to the level of the liquid becomes not less than the fluorescence-obtainable distance 34, and preferably, the distance L3 becomes larger than the fluorescence-obtainable distance 34. After the determined amount of the sealing liquid 17 is introduced into the analysis device 2, the sealing liquid 17 causes the sample 16 and the reagent 15 to be urged from the flow path 9 into the waste liquid storage section 12. Further, when introduction of the sealing liquid 17 is completed, the interface 18 between the sealing liquid 17 and the mixed solution of the sample 16 and the reagent 15 in the waste liquid storage section 12 is located at a position spaced from the bottom 6a of the receiving section 6 by a distance more than the fluorescence-obtainable distance 34 in the optical axial direction of the objective lens 31.

Operation of the analysis system 20 according to the present embodiment will be described.

In use of the analysis system 20 of the present embodiment, when introduction of the sealing liquid 17 is completed, the excess of the sample 16 and the reagent 15 and part of the sealing liquid 17 supplied to the flow path 9 are stored in the waste liquid storage section 12 as waste liquid. The mixed solution of the sample 16 and the reagent 15 overlies the sealing liquid 17 in the waste liquid storage section 12. The interface 18 between the sealing liquid 17 and the mixed solution of the sample 16 and the reagent 15 in the waste liquid storage section 12 is located at a position spaced from the bottom 6a of the receiving section 6 by a distance more than the fluorescence-obtainable distance 34 in the optical axial direction of the objective lens 31. Accordingly, the sample 16 and the reagent 15 stored in the waste liquid storage section 12 are located outside the region on which the optical system 30 can be focused. Since the mixed solution of the sample 16 and the reagent 15 in the waste liquid storage section 12 contains the analysis target and the reagent 15, it can emit fluorescence in response to irradiation by excitation light. In the present embodiment, when excitation light is irradiated to the mixed solution in the waste liquid storage section 12 through the optical system 30, fluorescence intensity is low since the mixed solution in the waste liquid storage section 12 is located at a position spaced from the focal position 32. Further, since the mixed solution in the waste liquid storage section 12 is not at a position that can be focused, fluorescence, if any, does not create a light dot on the image. Accordingly, the analysis system 20 in the present embodiment can increase the S/N ratio between the fluorescence in the receiving section 6 located close to the waste liquid storage section 12 and the fluorescence in the waste liquid storage section 12 to an extent that the presence or absence of fluorescence in the receiving section 6 can be determined by the analysis apparatus 37.

According to the analysis system 20 of the present embodiment, the excess of the sample 16 and the reagent 15 can be separated from the receiving section 6 by virtue of the sealing liquid 17 stored in the waste liquid storage section 12 even if the distance between the waste liquid storage section 12 and the receiving section 6 is small. By controlling the supplied amount of sealing liquid 17 using the control unit 29, the S/N ratio between the fluorescence in the receiving section 6 located close to the waste liquid storage section 12 and the fluorescence in the waste liquid storage section 12 can be increased. As a result, in the analysis system 20 according to the present embodiment, the reagent 15 stored in the waste liquid storage section 12 tends not to interfere with fluorescence observation in the receiving section 6, and thus highly reproducible analysis can be performed. In addition, the analysis device 2 can be reduced in size by reducing a distance from the receiving section 6 to the waste liquid storage section 12.

Although FIG. 5 shows an example similar to the first embodiment and the second embodiment in which the waste liquid storage section 12 is located in the vertical direction of the flow path (above the flow path), the waste liquid storage section 12 may be located in the horizontal direction of the flow path. That is, the waste liquid storage section 12 may be disposed on the side surface of the analysis device 2, 2A shown in FIG. 5. When the waste liquid storage section 12 is disposed in the horizontal direction of the flow path, the sample which is not stored in the micropore array may be moved in the direction of the observation surface (horizontal direction). Even in the case of the waste liquid storage section 12 disposed in the horizontal direction, the interface 18 may be formed between the sealing liquid 17 and the mixture of the sample 16 and the reagent 15, when stored in the waste liquid storage section 12, and the shortest distance between the interface 18 and the receiving section 6 is preferably 2 mm or more along the flow path 9.

When the waste liquid storage section 12 is disposed in the horizontal direction of the flow path, the analysis device 2, 2A may be low profile (reduced in thickness), providing high portability and reducing interference with an apparatus used for the analysis system 20.

Note that, positioning of the waste liquid storage section 12 is not limited to the vertical direction of the flow path and the horizontal direction of the flow path. The waste liquid storage section may be positioned obliquely above the flow path or obliquely below the flow path as long as it does not disturb analysis or detection of the sample, and the example of the present embodiment is merely illustrative.

(Modifications)

A modified example of the analysis device 2 of the above embodiments will be described.

The analysis device 2 of this modified example is used for analysis which does not use the beads 14.

A solution containing the analysis target is directly introduced into the analysis device 2 to thereby introduce the analysis target into the receiving section 6 for performing analysis. When the concentration of the analysis target is low, pre-amplification may be performed before a solution including the analysis target is introduced into the analysis device 2. Pre-amplification may be performed by polymerase chain reaction (PCR). PCR may be performed several to tens of cycles as necessary, preferably 10 cycles or more. Further, when the analysis target is RNA, reverse transcription PCR may be performed before a solution including the analysis target is introduced into the analysis device 2.

These amplification reactions may be performed by using a tube available on the market. Alternatively, a dedicated feature for pre-amplification may also be provided on the analysis device 2. After a solution including the amplification reagent 15 and the analysis target after the pre-amplification is introduced into the analysis device 2 to perform amplification in the analysis device 2, the detection reaction reagent 15 may be added thereto, and then a detection reaction (signal amplification reaction) can be performed in the receiving sections 6, which have been sealed with the sealing liquid 17.

In addition, when the analysis target has low concentration, a plurality of devices can be used in analysis so as to increase the number of receiving sections 6 which accommodate the analysis target. Further, a plurality of devices can also be used for analysis so that a solution containing the analysis target can be used without waste. In this case, a solution containing the analysis target can also be concentrated by evaporation before being introduced into the device.

Further, compared to the case where the beads 14 are used, the nucleic acid is not easily trapped in the receiving sections 6 if the beads 14 are not used. Accordingly, the receiving sections 6 can also be increased in volume so that more nucleic acid can be trapped in the receiving section 6. In this case, the diameter of the receiving sections 6 may be selected from the range of 100 nm or more and 100 μm or less, and preferably 1 μm to 100 μm. The reason for this is that, when the receiving sections 6 have a diameter smaller than 1 μm, it is difficult to hold the nucleic acids in the receiving sections 6. Further, when the receiving sections 6 have a diameter larger than 100 μm, a plurality of nucleic acids would enter one receiving section 6. The depth of the receiving section 6 can be selected from the range of 100 nm or more and 100 μm or less, and preferably 1 μm to 10 μm. When the receiving sections 6 have a depth smaller than 1 μm, it is difficult to hold the nucleic acids in the receiving sections 6. Further, when the receiving sections 6 have a depth larger than 100 μm, a plurality of nucleic acids would enter one receiving section 6.

If the volume of the receiving sections 6 is increased, a decrease in reaction speed is of a concern. Therefore, the receiving sections 6 can be vertically elongated so that fluorescence signals in the observation direction can be integrated to thereby facilitate observation. The ratio of the depth to the diameter of the receiving section 6 is preferably 1:1 or more. However, if the diameter is too small, observation by a camera becomes difficult. Accordingly, the diameter should be determined taking into consideration the length of the diameter. The ratio of the depth and the diameter of the receiving section 6 is more preferably 1:2 or more.

EXAMPLES

The embodiments of the present invention have been specifically described with reference to the drawings. However, the specific configurations should not be limited to these embodiments but should include design modifications and the like within the scope not departing from the spirit of the invention.

Example 1

<Manufacturing of Analysis Device>

The base 3 with 0.6 mm thickness, made of cycloolefin polymer, and having 1 million pores of 5 μm-diameter was manufactured by injection molding.

Then, a cover glass was set as a cover 7 so that a spacing of 100 μm was formed between the cover 7 and the base 3. A spacer 13 formed of an adhesive tape was disposed between the base 3 and the cover 7.

Further, by using the first liquid injection section 23 of the liquid injection apparatus 22 in the analysis apparatus shown in FIG. 5, aqueous liquid which does not contain nucleic acids was supplied as a substitution fluid into between the base 3 and the cover 7 via the liquid introduction section 11 so that 5 μm-diameter pores and the entire gap between the base 3 and the cover 7 were filled with the aqueous liquid.

In this example, the composition of the aqueous liquid was 20 mM MOPS pH 7.5, 15 mM NaCl, and 6.25 mM $MgCl_2$.

<Supply of Mixed Solution of Sample and Detection Reaction Reagent>

Invader reaction reagent (1 μM allele probe, 1 μM invader oligo, 1 μM FAM label arm, 20 mM MOPS pH7.5, 15 mM NaCl, 6.25 mM $MgCl_2$, 50 U/μL cleavase (registered trademark)) was mixed with artificially synthesized DNA to obtain a mixed solution X, which in turn was supplied into a gap between the base 3 and the cover 7 via the liquid introduction section 11 by using the first liquid injection section 23 of the liquid injection apparatus 22.

As for the concentration of the artificially synthesized DNAs, the artificially synthesized DNAs was added to the mixed solution X so that the concentration of the artificially synthesized DNAs becomes 3 pM at which one molecule was accommodated in one of the 5 µm-diameter pores formed in the base 3.

A cylindrical micropore with 5 µm diameter and 3 µm height has 59 fL volume. Thus, according to Poisson distribution, the artificially synthesized DNAs having 3 pM concentration occupy 10% of 1 million micropores.

After the mixture of the Invader reaction reagent and the artificially synthesized DNA was supplied, FC-40 (SIGMA) was supplied as the oil-based sealing liquid 17 into the gap between the base 3 and the cover 7 via the liquid introduction section 11 by using the second liquid injection section 24 of the liquid injection apparatus 22 to seal the 5 µm-diameter pores to thereby form 1 million independent nucleic acid detection reaction containers.

Here, the measurement in fluorescence observation was performed under different conditions, that is, the injection amount of the sealing liquid 17 was varied so that the distance L3 from the bottom 6a of the receiving section 6 to the interface 18 between the sealing liquid and the mixed solution of the sample and reagent in the waste liquid storage section 12, which is shown in FIG. 5, becomes 0 mm (Test A), 1 mm (Test B), 2 mm (Test C), 4 mm (Test D), and 8 mm (Test E).

<Measurement of Fluorescence Intensity, Examination of Distance L3 from Bottom of Receiving Section to Interface Between Sealing Liquid and Mixed Solution of Sample and Reagent>

Next, the analysis device having 1 million independent nucleic acid detection reaction containers according to the present example was incubated under the conditions of 63 degrees and 15 minutes, and imaged by a fluorescence microscope (corresponding to the optical system 30, the objective lens 31, the light source section 36, the imaging section 35, and the analysis apparatus 37 in FIG. 5) to observe fluorescence intensity in the pores.

Here, fluorescence images of the analysis device after reaction were imaged by using a fluorescence microscope.

Further, the control unit of the fluorescence microscope was configured to be able to detect the positions of the plurality of receiving sections of the analysis device placed on the stage, and the focal depth of the objective lens of the fluorescence microscope.

The focal depth of the objective lens used in the fluorescence microscope according to Example 1 was 3 µm.

In the Test A where the distance L3 was 0 mm, the number of nucleic acid-detection reaction containers that emit fluorescence cannot be counted due to an effect from fluorescence emission by a sample present in the flow path.

In Test B where the distance L3 was 1 mm, as with Test A, the number of nucleic acid detection reaction containers that emit fluorescence could not be counted since an effect from background fluorescence emission, which seems to be derived from nucleic acids present in the waste liquid storage section, was large.

In Test C where the distance L3 was 2 mm, Test D where the distance L3 was 4 mm, and Test E where the distance L3 was 8 mm, the number of nucleic acid detection reaction containers that emit fluorescence was counted apparently without being affected by fluorescence emission from nucleic acids present in the waste liquid storage section.

In particular, in device D and device E, having a distance L3 larger than 2 mm, the number of the nucleic acid detection reaction containers that emit fluorescence was counted with high reproducibility and reduced effect of noise without being affected by fluorescence emission from nucleic acids present in the waste liquid storage section.

From these results, according to the analysis apparatus using the analysis device of the present example, the fluorescence-obtainable distance 34 seems to be 2 mm (Strictly, the fluorescence-obtainable distance 34 seems to be between 1 mm and 2 mm, and 2 mm seems to be the threshold of the fluorescence-obtainable distance 34).

That is, when the relationship of the fluorescence-obtainable distance 34 (2 mm)>L3 was established, counting the number of the nucleic acid detection reaction containers that emit fluorescence was difficult. On the other hand, when the relationship of the fluorescence-obtainable distance 34 (2 mm)≤L3 was established, counting the number of the nucleic acid detection reaction containers that emit fluorescence was possible.

Thus, it was confirmed that, according to device C to device E, in which the distance L3 from the bottom of the receiving section to the interface between the sealing liquid and the mixed solution of the sample and the reagent in the waste liquid storage section is 2 mm or more (not less than the fluorescence-obtainable distance), the number of nucleic acid detection reaction containers that emit fluorescence was counted without being affected by the fluorescence emission, which seems to be derived from nucleic acids present in the waste liquid storage section.

Further, it was also confirmed that, when the relationship of the fluorescence-obtainable distance 34 (2 mm)≤L3 was established, the interface between the sealing liquid and the mixture of the sample and the reagent when the sample and the reagent are stored in the waste liquid storage section and overlies the sealing liquid is located outside the range of the focal depth when a focus of the objective lens is set at the plurality of containers.

Other Examples

The above first embodiment is described for the case where the analysis device is used as an array device for quantitative determination of nucleic acid. However, the analysis target with use of an analysis device is not limited to nucleic acids. For example, the analysis device according to the embodiments of the present invention may be applicable to array devices for analyzing proteins, lipids, sugar chains and the like.

Further, the above first embodiment is described for the case where beads having a specific gravity larger than that of a solvent of the mixed solution of the reagent and the sample are used. However, when the receiving sections are formed to be open vertically downward (the receiving sections are formed to be open downward in supply of the mixed solution), the reagent can contain the beads having a specific gravity smaller than that of a solvent so that the analysis target in the sample can be accommodated in the receiving sections together with the beads.

Further, various types of liquid used for biochemical reaction may be supplied in advance into the flow path so that the flow path is filled with the solution. For example, the detection reaction reagent may be filled in advance into the analysis device, and, after long-term preservation, the sealing liquid may be supplied into the flow path, followed by measurement. In this case, the inlet and the outlet between the micropore array layer and the cover need to be sealed with a lid member. The lid member may be a molded product made of plastic or metal, a polymer gel material, a film-shaped sealing material, or may be achieved by adhesion with the cover by lamination.

The analysis devices disclosed in the above embodiments may be provided as a plurality of analysis devices connected to each other. In this case, the analysis devices may be configured to be separately used for each analysis.

Further, the analysis device may include a space in which hybridization reaction is performed. Alternatively, hybridization reaction can be performed in the waste liquid storage section.

Further, in the analysis device that is applicable to the analysis system disclosed in the third embodiment, the waste liquid storage section may be located at any position in the analysis device as long as the mixed solution of the sample and the reagent in the waste liquid storage section is positioned outside the range of the focal depth of the objective lens. For example, the outlet of the flow path and the waste liquid storage section can be configured to be located on the optical axis of the objective lens when fluorescence at the respective receiving sections is observed.

Further, only one through hole may be provided so that the inlet and the outlet of the flow path may be used in common in the analysis device. In this case, the size of the through hole is not specifically limited. For example, a through hole may be formed in the cover such that an opening diameter includes a plurality of receiving sections as viewed in the thickness direction of the substrate. In this case, in the region in which the receiving sections are disposed, the top of the flow path is open via the through hole. In this region, the mixed solution of the sample and the reagent in the receiving section is sealed with the sealing liquid, and an excess of the mixed solution of the sample and the reagent overlies the sealing liquid. In this case as well, the control unit can determine the introduction amount of the sealing liquid so that the an excess of the mixed solution of the sample and the reagent is moved by the sealing liquid to the outside of the range of the focal depth of the objective lens to thereby improve the S/N ratio between the fluorescence from the excess of the mixed solution of the sample and the reagent and the fluorescence from the receiving sections as with the third embodiment.

Further, the components described in the above embodiments and modifications thereof can be combined with each other as appropriate.

Further, design changes and the like to the above specific configurations are not limited to the above description.

The present application addresses the following; in the technique described in PTL 1, when digital counting is performed by equipment, waste liquid of the reagent which has been supplied to the device is required to be collected. Accordingly, there is a need for providing a waste liquid collecting apparatus, which inevitably leads to an increase in overall size of the apparatus. Further, when waste liquid is not collected but stored in the device, the waste liquid disturbs fluorescence measurement in digital counting, which causes difficulty in performing highly reproducible analysis.

The present invention has an aspect of providing analysis devices, analysis kits, and analysis systems for performing highly reproducible analysis.

An analysis apparatus according to a first aspect of the present invention includes: an analysis device including a plurality of containers in which a sample and a reagent used for biochemical reaction are accommodated, a flow path having an inlet and an outlet and communicating with the plurality of containers, a liquid introduction section that is connected to the inlet so as to supply the sample and the reagent and the sealing liquid that individually seals the plurality of containers into the flow path, and a waste liquid storage section that is connected to the outlet so as to store an excess of the sample and the reagent accommodated in the plurality of containers and part of the sealing liquid supplied to the flow path, as waste liquid; a stage on which the analysis device is placed; an objective lens and an optical system configured to emit excitation light to the plurality of containers of the analysis device placed on the stage and observe fluorescence generated in the plurality of containers induced by the excitation light; and a control unit that introduces a predetermined amount of the sealing liquid from the liquid introduction section so that an interface between the sealing liquid, and the excess of the sample and the reagent is formed in the waste liquid storage section, wherein a distance between the interface between the sealing liquid, and the excess of the sample and the reagent in the waste liquid storage section, and the bottom of the plurality of containers is not less than a fluorescence-obtainable distance.

The control unit may be configured to obtain positions of the plurality of containers of the analysis device placed on the stage and a focal depth of the objective lens, and the control unit may determine a supply amount of the sealing liquid so that the interface between the sealing liquid, and the excess of the sample and the reagent in the waste liquid storage section is located outside a range of the focal depth when a focus of the objective lens is set at the plurality of containers.

The fluorescence-obtainable distance may be 2 mm.

The shortest distance between the interface, which is between the sealing liquid, and the excess of the sample and the reagent in the waste liquid storage section, and the plurality of receiving sections may be 2 mm or more.

The shortest distance between the waste liquid storage section and the plurality of containers along the flow path may be 2 mm or more.

The specific gravity of the sealing liquid may be larger than the specific gravity of the reagent.

The waste liquid storage section may be disposed in a vertical direction of the flow path so that the interface is formed in the waste liquid storage section with the excess of the sample and the reagent overlying the sealing liquid.

The waste liquid storage section may be disposed in the horizontal direction of the flow path.

The volume of the waste liquid storage section may be larger than the volume of the flow path.

An analysis device according to a second aspect of the present invention includes: a plurality of containers in which a sample and a reagent used for biochemical reaction are accommodated; a flow path having an inlet and an outlet and communicating with the plurality of containers; a liquid introduction section connected to the inlet; and a waste liquid storage section connected to the outlet, wherein a shortest distance between the waste liquid storage section and the plurality of containers along the flow path is 2 mm or more.

An analysis kit includes: the analysis device according to the above aspect; the reagent; and a sealing liquid supplied to the flow path to individually seal the plurality of containers, the sealing liquid having a specific gravity larger than a specific gravity of the reagent.

According to the analysis apparatus (analysis system), the analysis device, and the analysis kit according to the above aspects of the present invention, the reagent stored in the waste liquid storage section tends not to interfere with the fluorescence observation in the receiving sections, and thus highly reproducible analysis can be performed.

REFERENCE SIGNS LIST

1 . . . analysis kit
2, 2A . . . analysis device

3 ... base
4 ... substrate
5 ... micropore array layer
6 ... receiving section
7 ... cover
8 ... inlet
9 ... flow path
10 ... outlet
11 ... liquid introduction section
12 ... waste liquid storage section
13 ... spacer
14 ... bead
15 ... reagent
16 ... sample (sample containing analysis target)
17 ... sealing liquid
18 ... interface
20 ... analysis apparatus (analysis system)
21 ... stage
22 ... liquid injection apparatus
23 ... first liquid injection section
24 ... second liquid injection section
25 ... tank
26 ... pipe
27 ... nozzle
28 ... pump
29 ... control unit
30 ... optical system
31 ... objective lens
32 ... focal position
33 ... focal depth
34 ... fluorescence-obtainable distance Obviously, numerous modifications and variations of the present invention are possible in light of the above teachings. It is therefore to be understood that within the scope of the appended claims, the invention may be practiced otherwise than as specifically described herein.

What is claimed is:

1. An analytical method, comprising:
   supplying a sample and a reagent for a biochemical reaction to an analysis device from a liquid introduction section of the analysis device such that the sample and reagent enter a flow path of the analysis device from an inlet of the analysis device and fill a plurality of receiving sections in the analysis device through the flow path;
   supplying a sealing liquid to the analysis device from the liquid introduction section of the analysis device such that the sealing liquid enters the flow path of the analysis device from the inlet of the analysis device and seals the inlet, an outlet of the analysis device, and the sample and reagent in the receiving sections;
   applying an excitation light to the plurality of receiving sections of the analysis device through an objective lens;
   observing fluorescence emitted from the sample generated by the excitation light; and
   conducting an analysis based on the fluorescence emitted from the sample,
   wherein the supplying of the sample and reagent and the supplying of the sealing liquid includes controlling amounts of the sample, reagent and sealing liquid to the analysis device such that an excess of the sample and reagent and a part of the sealing liquid are discharged from the flow path and stored in a waste liquid storage section of the analysis device and that an interface is formed between the part of the sealing liquid and the excess of the sample and reagent in the waste liquid storage section of the analysis device at a distance not less than a fluorescence-obtainable distance from a bottom of the analysis device, and the controlling includes controlling the amount of the sealing liquid to the analysis device such that the interface is formed in the waste liquid storage section of the analysis device and outside a range of a focal depth of the objective lens.

2. The analytical method of claim 1, wherein the applying of the excitation light is conducted through the objective lens such that a focal position of the objective lens is set at bottoms of the receiving sections in the analysis device, respectively.

3. The analytical method of claim 1, wherein the fluorescence-obtainable distance is 2 mm.

4. The analytical method of claim 1, wherein the controlling includes controlling the amount of the sealing liquid such that a shortest distance between the interface and the plurality of receiving sections is at least 2 mm.

5. The analytical method of claim 1, wherein the sealing liquid has a specific gravity larger than a specific gravity of the reagent.

6. The analytical method of claim 2, wherein the fluorescence-obtainable distance is 2 mm.

7. The analytical method of claim 2, wherein the controlling includes controlling the amount of the sealing liquid such that a shortest distance between the interface and the plurality of receiving sections is at least 2 mm.

8. The analytical method of claim 2, wherein the sealing liquid has a specific gravity larger than a specific gravity of the reagent.

9. The analytical method of claim 3, wherein the controlling includes controlling the amount of the sealing liquid such that a shortest distance between the interface and the plurality of receiving sections is at least 2 mm.

10. The analytical method of claim 3, wherein the sealing liquid has a specific gravity larger than a specific gravity of the reagent.

11. The analytical method of claim 4, wherein the sealing liquid has a specific gravity larger than a specific gravity of the reagent.

12. The analytical method of claim 1, wherein the analysis device includes a base having the receiving sections and a cover positioned to form the flow path in a gap between the base and the cover, and the cover and the waste liquid storage section are shaped such that a shortest distance between the interface and the plurality of receiving sections is at least 2 mm.

13. The analytical method of claim 1, wherein the waste liquid storage section is positioned vertically with respect to a direction of the flow path such that the excess of the sample and the reagent overlies the sealing liquid and forms the interface in the waste liquid storage section.

14. The analytical method of claim 1, wherein the waste liquid storage section has a volume larger than a volume of the flow path.

15. The analytical method of claim 2, wherein the waste liquid storage section is positioned vertically with respect to a direction of the flow path such that the excess of the sample and the reagent overlies the sealing liquid and forms the interface in the waste liquid storage section.

16. The analytical method of claim 2, wherein the waste liquid storage section has a volume larger than a volume of the flow path.

17. The analytical method of claim 3, wherein the waste liquid storage section is positioned vertically with respect to a direction of the flow path such that the excess of the sample and the reagent overlies the sealing liquid and forms the interface in the waste liquid storage section.

18. The analytical method of claim 3, wherein the waste liquid storage section has a volume larger than a volume of the flow path.

19. The analytical method of claim 12, wherein the waste liquid storage section is positioned vertically with respect to a direction of the flow path such that the excess of the sample and the reagent overlies the sealing liquid and forms the interface in the waste liquid storage section.

20. The analytical method of claim 2, wherein the analysis device includes a base having the receiving sections and a cover positioned to form the flow path in a gap between the base and the cover, the cover and the waste liquid storage section are shaped such that a shortest distance between the interface and the plurality of receiving sections is at least 2 mm, and the waste liquid storage section is positioned vertically with respect to a direction of the flow path such that the excess of the sample and the reagent overlies the sealing liquid and forms the interface in the waste liquid storage section.

* * * * *